United States Patent
Papasakellariou et al.

(10) Patent No.: US 9,479,301 B2
(45) Date of Patent: Oct. 25, 2016

(54) MULTIPLEXING RESOURCE ELEMENT GROUPS FOR CONTROL CHANNEL ELEMENTS OF CONTROL CHANNELS

(71) Applicant: Samsung Electronics Co., Ltd., Gyeonggi-do (KR)

(72) Inventors: Aris Papasakellariou, Houston, TX (US); Hyoung-Ju Ji, Seoul (KR); Jin-Kyu Han, Seoul (KR)

(73) Assignee: Samsung Electronics Co., Ltd (KR)

( * ) Notice: Subject to any disclaimer, the term of this patent is extended or adjusted under 35 U.S.C. 154(b) by 3 days.

(21) Appl. No.: 14/021,704

(22) Filed: Sep. 9, 2013

(65) Prior Publication Data
US 2014/0071915 A1    Mar. 13, 2014

Related U.S. Application Data

(60) Provisional application No. 61/697,907, filed on Sep. 7, 2012, provisional application No. 61/717,933, filed on Oct. 24, 2012, provisional application No. 61/721,247, filed on Nov. 1, 2012.

(51) Int. Cl.
*H04L 5/00* (2006.01)
*H04W 72/04* (2009.01)

(52) U.S. Cl.
CPC ........... *H04L 5/0044* (2013.01); *H04L 5/0053* (2013.01); *H04L 5/0092* (2013.01); *H04W 72/042* (2013.01); *H04L 5/0007* (2013.01)

(58) Field of Classification Search
CPC . H04W 48/10; H04W 48/12; H04W 74/002; H04W 74/006; H04W 74/04
See application file for complete search history.

(56) References Cited

U.S. PATENT DOCUMENTS

| | | |
|---|---|---|
| 2011/0243039 A1 | 10/2011 | Papasakellariou et al. |
| 2012/0213192 A1 | 8/2012 | Kiyoshima et al. |
| 2012/0263134 A1 | 10/2012 | Malladi et al. |
| 2013/0039284 A1* | 2/2013 | Marinier et al. ............. 370/329 |
| 2013/0188566 A1* | 7/2013 | Zhu et al. .................... 370/329 |
| 2013/0242770 A1* | 9/2013 | Chen et al. .................. 370/252 |
| 2013/0242947 A1* | 9/2013 | Chen .................... H04W 72/04 370/335 |
| 2014/0036747 A1* | 2/2014 | Nory et al. ................... 370/311 |
| 2014/0293957 A1* | 10/2014 | Chun et al. .................. 370/329 |
| 2015/0009927 A1 | 1/2015 | Larsson et al. |

FOREIGN PATENT DOCUMENTS

WO    WO 2012/109542    8/2012

OTHER PUBLICATIONS

Panasonic, "RE Mapping for ePDCCH", R1-123287, 3GPP TSG RAN WG1 Meeting #70, Aug. 13-17, 2012.

(Continued)

*Primary Examiner* — Gary Mui
*Assistant Examiner* — Stephen Steiner
(74) *Attorney, Agent, or Firm* — The Farrell Law Firm, P.C.

(57) ABSTRACT

Methods and apparatus are described for forming Control Channel Elements (CCEs) from Resource Element Groups (REGs) that are located in one or more Physical Resource Block (PRB) pairs from a set of PRB pairs, for determining a first symbol in a Transmission Time Interval (TTI) for a Physical Downlink Shared Channel (PDSCH), and for determining whether the PDSCH includes all PRB pairs indicated by a respective PDCCH scheduling the PDSCH.

24 Claims, 16 Drawing Sheets

(56) References Cited

OTHER PUBLICATIONS

Renesas Mobile Europe Ltd., "eREG Resource Mapping", R1-123584, 3GPP TSG-RAN WG1 Meeting #70, Aug. 13-17, 2012.
LG Electronics, "Discussion on ECCE Definition", R1-123525, 3GPP TSG RAN WG1 Meeting #70, Aug. 13-17, 2012.
Ericsson, ST-Ericsson, "Mapping of ePDCCH to RE", R1-123614, 3GPP TSG-RAN WG1 #70, Aug. 13-17, 2012.
NTT Docomo, "Views on eREG-to-eCCE Mapping for ePDCCH", R1-123549, 3GPP TSG RAN WG1 Meeting #70, Aug. 13-17, 2012.
U.S. Office Action dated Feb. 25, 2015 issued in counterpart U.S. Appl. No. 14/021,663.
Nokia, Nokia Siemens Networks, "On the Need for Indicating the ePDCCH Pairs to the UE", R1-123652, 3GPP TSG RAN WG1 Meeting #70, Aug. 13-17, 2012, 2 pages.
ZTE Corporation, "Indication to the UE with ePDCCH Resources", R1-123316, 3GPP TSG RAN WG1 Meeting #70, Aug. 13-17, 2012, 2 pages.
Renesas Mobile Europe Ltd, "Need for Dynamic Indication of ePDCCH PRB Pairs", R1-123585, 3GPP TSG-RAN WG1 Meeting #70, Aug. 13-17, 2012, 4 pages.
European Search Report dated May 11, 2016 issued in counterpart application No. 13835405.5-1851, 9 pages.
U.S. Office Action dated Aug. 23, 2016 issued in counterpart U.S. Appl. No. 14/021,663, 27 pages.

\* cited by examiner

ECCEs 820

| | 0 | 2 | 4 | 6 | 8 | 10 | 12 | 14 | 16 | 18 | 20 | 22 | 24 | 26 | 28 | 30 |
|---|---|---|---|---|---|---|---|---|---|---|---|---|---|---|---|---|
| 800 ~ PRB0 | 0 | 1 | 2 | 3 | 4 | 5 | 6 | 7 | 8 | 9 | 10 | 11 | 12 | 13 | 14 | 15 |
| 802 ~ PRB1 | 4 | 5 | 6 | 7 | 8 | 9 | 10 | 11 | 12 | 13 | 14 | 15 | 0 | 1 | 2 | 3 |
| 804 ~ PRB2 | 8 | 9 | 10 | 11 | 12 | 13 | 14 | 15 | 0 | 1 | 2 | 3 | 4 | 5 | 6 | 7 |
| 806 ~ PRB3 | 12 | 13 | 14 | 15 | 0 | 1 | 2 | 3 | 4 | 5 | 6 | 7 | 8 | 9 | 10 | 11 |

840

ECCEs 830

| | 1 | 3 | 5 | 7 | 9 | 11 | 13 | 15 | 17 | 19 | 21 | 23 | 25 | 27 | 29 | 31 |
|---|---|---|---|---|---|---|---|---|---|---|---|---|---|---|---|---|
| 810 ~ PRB4 | 2 | 3 | 4 | 5 | 6 | 7 | 8 | 9 | 10 | 11 | 12 | 13 | 14 | 15 | 0 | 1 |
| 812 ~ PRB5 | 6 | 7 | 8 | 9 | 10 | 11 | 12 | 13 | 14 | 15 | 0 | 1 | 2 | 3 | 4 | 5 |
| 814 ~ PRB6 | 10 | 11 | 12 | 13 | 14 | 15 | 0 | 1 | 2 | 3 | 4 | 5 | 6 | 7 | 8 | 9 |
| 816 ~ PRB7 | 14 | 15 | 0 | 1 | 2 | 3 | 4 | 5 | 6 | 7 | 8 | 9 | 10 | 11 | 12 | 13 |

ECCEs - TP 0 (930)

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| PRB0 (910) | 0 | 1 | 2 | 3 | 4 | 5 | 6 | 7 | 8 | 9 | 10 | 11 | 12 | 13 | 14 | 15 |
| PRB1 (912) | 4 | 5 | 6 | 7 | 8 | 9 | 10 | 11 | 12 | 13 | 14 | 15 | 0 | 1 | 2 | 3 |
| PRB2 (914) | 8 | 9 | 10 | 11 | 12 | 13 | 14 | 15 | 0 | 1 | 2 | 3 | 4 | 5 | 6 | 7 |
| PRB3 (916) | 12 | 13 | 14 | 15 | 0 | 1 | 2 | 3 | 4 | 5 | 6 | 7 | 8 | 9 | 10 | 11 |

(950)

ECCEs - TP 1 (940)

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| PRB3 (920) | 12 | 13 | 14 | 15 | 0 | 1 | 2 | 3 | 4 | 5 | 6 | 7 | 8 | 9 | 10 | 11 |
| PRB1 (922) | 4 | 5 | 6 | 7 | 8 | 9 | 10 | 11 | 12 | 13 | 14 | 15 | 0 | 1 | 2 | 3 |
| PRB0 (924) | 0 | 1 | 2 | 3 | 4 | 5 | 6 | 7 | 8 | 9 | 10 | 11 | 12 | 13 | 14 | 15 |
| PRB2 (926) | 8 | 9 | 10 | 11 | 12 | 13 | 14 | 15 | 0 | 1 | 2 | 3 | 4 | 5 | 6 | 7 |

ECCEs ~ 1030

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 1010 ~ PRB 0 | 0 | 1 | 2 | 3 | 4 | 5 | 6 | 7 | 8 | 9 | 10 | 11 | 12 | 13 | 14 | 15 |
| 1012 ~ PRB 1 | 4 | 5 | 6 | 7 | 8 | 9 | 10 | 11 | 12 | 13 | 14 | 15 | 0 | 1 | 2 | 3 |
| 1014 ~ PRB 2 | 8 | 9 | 10 | 11 | 12 | 13 | 14 | 15 | 0 | 1 | 2 | 3 | 4 | 5 | 6 | 7 |
| 1016 ~ PRB 3 | 12 | 13 | 14 | 15 | 0 | 1 | 2 | 3 | 4 | 5 | 6 | 7 | 8 | 9 | 10 | 11 |

{1, 0, 1, 0} ~ 1040

1050     1052     1054     1056

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 1010 ~ PRB 0 | 0 | 1 | 2 | 3 | 4 | 5 | 6 | 7 | 8 | 9 | 10 | 11 | 12 | 13 | 14 | 15 |
| 1012 ~ PRB 1 | 4 | 5 | 6 | 7 | 8 | 9 | 10 | 11 | 12 | 13 | 14 | 15 | 0 | 1 | 2 | 3 |
| 1014 ~ PRB 2 | 8 | 9 | 10 | 11 | 12 | 13 | 14 | 15 | 0 | 1 | 2 | 3 | 4 | 5 | 6 | 7 |
| 1016 ~ PRB 3 | 12 | 13 | 14 | 15 | 0 | 1 | 2 | 3 | 4 | 5 | 6 | 7 | 8 | 9 | 10 | 11 |

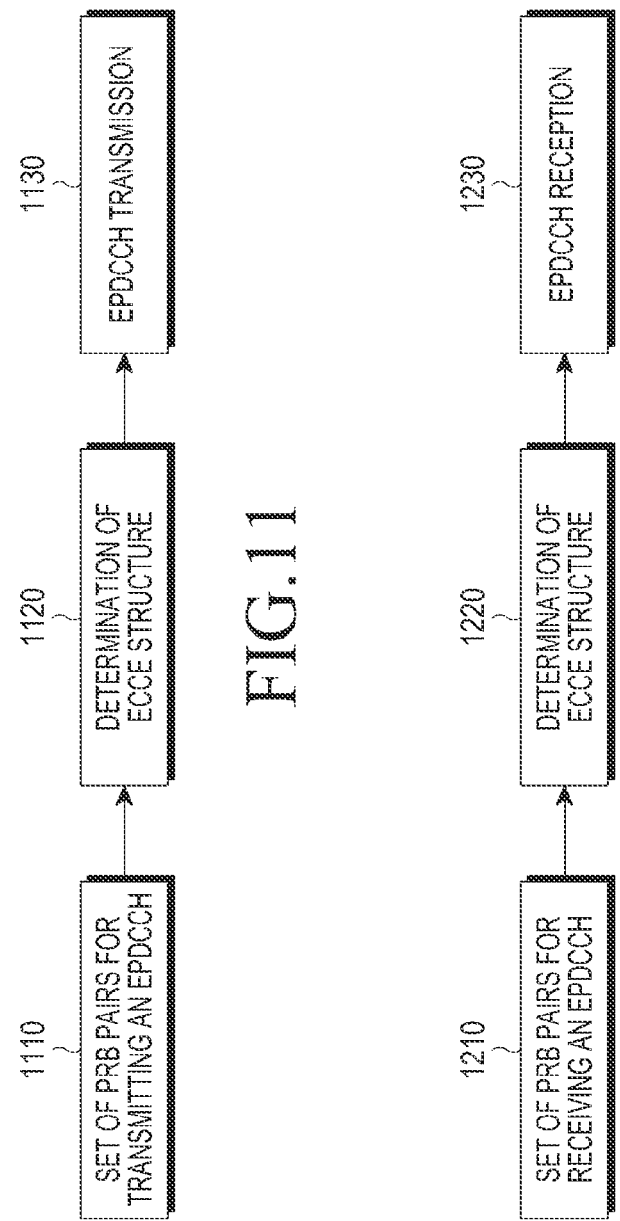

MULTIPLEXING RESOURCE ELEMENT GROUPS FOR CONTROL CHANNEL ELEMENTS OF CONTROL CHANNELS

PRIORITY

The present application claims priority under 35 U.S.C. §119(e) to U.S. Provisional Applications No. 61/697,907, No. 61/717,933, and No. 61/721,247, which were filed in the United States Patent and Trademark Office on Sep. 7, 2012, on Oct. 24, 2012, and on Nov. 1, 2012, respectively, the entire disclosures of which are incorporated herein by reference.

BACKGROUND OF THE INVENTION

1. Field of the Invention

The present invention generally relates to wireless communication systems and, more particularly, to the transmission and reception of physical downlink control channels.

2. Description of the Related Art

A communication system includes a DownLink (DL) that conveys transmission signals from Transmission Points (TPs) such as Base Stations (BS or NodeBs) to User Equipments (UEs), and an UpLink (UL) that conveys transmission signals from UEs to Reception Points (RPs) such as NodeBs. A UE, also commonly referred to as a terminal or a mobile station, may be fixed or mobile and may be a cellular phone, a personal computer device, etc. A NodeB is generally a fixed station and may also be referred to as an access point or some other equivalent terminology.

DL signals include data signals conveying information content, control signals conveying DL Control Information (DCI), and Reference Signals (RS) that are also known as pilot signals. A TP transmits data information or DCI to UEs through respective Physical DL Shared CHannels (PDSCHs) or DL Control CHannels (CCHs). UL signals also consist of data signals, control signals, and RS. A UE transmits data information or UL Control Information (UCI) to an RP through a respective Physical Uplink Shared CHannel (PUSCH) or a Physical Uplink Control CHannel (PUCCH).

A PDSCH transmission to a UE or a PUSCH transmission from a UE may be in response to dynamic scheduling or to Semi-Persistent Scheduling (SPS). With dynamic scheduling, a TP conveys to a UE a DCI format, through a respective Physical DL Control CHannel (PDCCH), that provides a Scheduling Assignment (SA) for a PDSCH (DL SA) or for a PUSCH (UL SA). With SPS, a PDSCH or a PUSCH transmission is configured to a UE by a TP through higher layer signaling, such as Radio Resource Control (RRC) signaling, to occur at predetermined time instances and with predetermined parameters as informed by the higher layer signaling.

A TP may also transmit multiple types of RSs including a UE-Common RS (CRS), a Channel State Information RS (CSI-RS), and a DeModulation RS (DMRS). A CRS is transmitted over substantially an entire DL system BandWidth (BW) and can be used by all UEs to demodulate data or control signals, or to perform measurements. To reduce an overhead associated with a CRS, a TP can transmit a CSI-RS with a smaller density in a time domain and/or frequency domain than a CRS for UEs to perform measurements. A TP can transmit a DMRS only in a BW of a respective PDSCH. A UE may use a DMRS to demodulate information in a PDSCH.

FIG. 1 illustrates a transmission structure for a DL Transmission Time Interval (TTI).

Referring to FIG. 1, a DL TTI includes one subframe 110 which includes two slots 120 and a total of $N_{symb}^{DL}$ symbols for transmitting data information, DCI, or RS. A first number of $M_{symb}^{DL}$ symbols are used to transmit PDCCHs and other control channels (not shown) 130 and can be informed to a UE either through a transmission of a Control channel Format Indicator (CFI) field in a Physical Control Format Indicator CHannel (PCFICH) or through higher layer signaling such as Radio Resource Control (RRC) signaling. A remaining number of $N_{symb}^{DL} - M_{symb}^{DL}$ symbols are primarily used to transmit PDSCHs 140. A transmission BW consists of frequency resource units referred to as Resource Blocks (RBs). Each RB consists of $N_{sc}^{RB}$ sub-carriers, or Resource Elements (REs), and a UE is allocated $M_{PDSCH}$ RBs for a total of $M_{sc}^{PDSCH} = M_{PDSCH} \cdot N_{sc}^{RB}$ REs for a PDSCH transmission BW. An allocation of one RB in a frequency domain and of one slot or two slots (one subframe) in a time domain will be referred to as a Physical RB (PRB) or as a PRB pair, respectively. Some REs in some symbols contain CRS 150, CSI-RS or DMRS.

DCI can serve several purposes. A DCI format in a respective PDCCH may schedule a PDSCH or a PUSCH providing data or control information to or from a UE, respectively. Another DCI format in a respective PDCCH may schedule a PDSCH providing System Information (SI) to a group of UEs for network configuration parameters, or a response to a Random Access (RA) by UEs, or paging information, and so on. Another DCI format may provide to a group of UEs Transmission Power Control (TPC) commands for SPS transmissions in respective PUSCHs or PUCCHs.

A DCI format includes Cyclic Redundancy Check (CRC) bits in order for a UE to confirm a correct detection. The DCI format type is identified by a Radio Network Temporary Identifier (RNTI) that scrambles the CRC bits. For a DCI format scheduling a PDSCH or a PUSCH to a single UE, the RNTI is a Cell RNTI (C-RNTI). For a DCI format scheduling a PDSCH conveying SI to a group of UEs, the RNTI is an SI-RNTI. For a DCI format scheduling a PDSCH providing a response to an RA from a group of UEs, the RNTI is an RA-RNTI. For a DCI format scheduling a PDSCH paging a group of UEs, the RNTI is a P-RNTI. For a DCI format providing TPC commands to a group of UEs, the RNTI is a TPC-RNTI. Each RNTI type is configured to a UE through higher layer signaling from a TP (and the C-RNTI is unique for each UE).

FIG. 2 illustrates an encoding and transmission process for a DCI format.

Referring to FIG. 2, an RNTI of a DCI format masks a CRC of a codeword in order to enable a UE to identify a DCI format type. A CRC 220 of (non-coded) DCI format bits 210 is computed and it is subsequently masked at 230 using an exclusive OR (XOR) operation between CRC 220 and RNTI bits 240; that is, XOR(0,0)=0, XOR(0,1)=1, XOR(1,0)=1, XOR(1,1)=0. A masked CRC is then appended to DCI format bits 250, channel coding 260 is performed, for example using a convolutional code, followed by rate matching 270 to allocated resources, and finally by interleaving and modulation 280, and transmission of a control signal 290. For example, both a CRC and an RNTI consist of 16 bits.

FIG. 3 illustrates a reception and decoding process for a DCI format.

Referring to FIG. 3, a received control signal 310 is demodulated and resulting bits are de-interleaved at the demodulator & de-interleaver 320, a rate matching applied at a TP is restored at a rate de-matcher 330, and control information is subsequently decoded a channel decoder 340. After decoding, DCI format bits 360 are obtained after extracting CRC bits at the CRC extraction unit 350 which are then de-masked 370 through a XOR operation with an RNTI 380. Finally, a UE performs a CRC test at the CRC tester 390. If the CRC test passes, a UE considers a respective DCI format as valid and determines parameters for PDSCH reception or PUSCH transmission. If the CRC test does not pass, the UE disregards a respective DCI format.

A TP separately codes and transmits a DCI format in a respective PDCCH. To avoid a first PDCCH transmission blocking a second PDCCH transmission, a location of each PDCCH in a DL control region is not unique. As a consequence, a UE needs to perform multiple decoding operations per subframe to determine whether there is a PDCCH intended for it. REs carrying a PDCCH are grouped into Control Channel Elements (CCEs) in a logical domain. CCE aggregation levels may consist, for example, of 1, 2, 4, and 8 CCEs. Each CCE of a PDCCH is formed by Resource Element Groups (REGs) consisting of REs which are interleaved over a PDCCH transmission BW. For example, a CCE may consist of nine REGs which are formed by four consecutive REs (after discounting REs allocated to other signals).

For a PDCCH detection, a UE may determine a search space for candidate PDCCH locations after it restores CCEs in a logical domain according to a UE-common set of CCEs (Common Search Space or CSS) and according to a UE-dedicated set of CCEs (UE-Dedicated Search Space or UE-DSS). A CSS may consist of first C CCEs in a logical domain which may be used to transmit PDCCHs for DCI formats associated with UE-common control information and use an SI-RNTI, a P-RNTI, a TPC-RNTI, and so on, to scramble respective CRCs. A UE-DSS consists of remaining CCEs which are used to transmit PDCCHs for DCI formats associated with UE-specific control information and use respective C-RNTIs to scramble respective CRCs. CCEs of a UE-DSS may be determined according to a pseudo-random function having as inputs UE-common parameters, such as a subframe number or a total number of CCEs in a subframe, and UE-specific parameters such as a C-RNTI. For example, for a CCE aggregation level of $L \in \{1, 2, 4, 8\}$ CCEs, CCEs for PDCCH candidate m are given by Equation (1):

$$\text{CCEs for PDCCH candidate } m = L \cdot \{(Y_k + m) \bmod \lfloor N_{CCE,k}/L \rfloor\} + i \quad (1)$$

In Equation (1), $N_{CCE,k}$ is a total number of CCEs in subframe k, $i = 0, \ldots, L-1$, $m = 0, \ldots, M_C^{(L)} - 1$, $M_C^{(L)}$ is a number of PDCCH candidates for aggregation level L, and "mod" is the modulo operation. For example, for $L \in \{1, 2, 4, 8\}$, $M_C^{(L)} \in \{6, 6, 2, 2\}$. For UE-DSS, $Y_k = (A \cdot Y_{k-1}) \bmod D$ where $Y_{-1} = \text{C-RNTI} \neq 0$, $A = 39827$ and $D = 65537$. For CSS, $Y_k = 0$.

A conventional DL control region may occupy a maximum of $M_{symb}^{DL} = 3$ subframe symbols and a PDCCH is transmitted substantially over an entire DL BW. Consequently, network functionalities that are needed in several operating cases, such as extended PDCCH capacity and PDCCH interference coordination in a frequency domain cannot be supported. One such case is the use of Remote Radio Heads (RRHs) in a network where a UE may receive DL signals either from a macro-TP or from an RRH. If RRHs and a macro-NodeB share a same cell identity, cell splitting gains do not exist and expanded PDCCH capacity is needed to accommodate PDCCH transmissions from both a macro-TP and RRHs. Another case is for heterogeneous networks where DL signals from a pico-TP experience strong interference from DL signals from a macro-TP, and interference coordination in a frequency domain among TPs is needed.

A direct extension of a conventional DL control region size to more than $M_{symb}^{DL} = 3$ subframe symbols is not possible at least due to a need for support of conventional UEs which cannot be aware of or support such extension. An alternative is to support DL control signaling in a PDSCH region by using individual PRB pairs. A PDCCH transmitted in one or more PRB pairs of a conventional PDSCH region will be referred to as Enhanced PDCCH (EPDCCH).

FIG. 4 is a diagram illustrating an EPDCCH transmission structure in a DL TTI.

Referring to FIG. 4, EPDCCH transmissions start immediately after PDCCH transmissions 410 and are transmitted over all remaining DL subframe symbols. EPDCCH transmissions may occur in four PRB pairs, 420, 430, 440, and 450, while remaining PRB pairs 460, 462, 464, 466, and 468 may be used for PDSCH transmissions. PRB pairs may be grouped in PRB Groups (RBGs) and a PDSCH transmission may be in RBGs. A UE may not receive PDSCH in a PRB pair within an RBG if this PRB pair is used to transmit the EPDCCH scheduling the PDSCH. As an EPDCCH transmission over a given number of subframe symbols may require fewer REs than the number of subframe symbols available in a PRB pair, multiple EPDCCHs may be multiplexed in a same PRB pair. The multiplexing can be in any combination of possible domains (i.e., time domain, frequency domain, or spatial domain) and, in a manner similar to a PDCCH, an EPDCCH includes at least one Enhanced CCE (ECCE).

A UE can be configured by higher layer signaling from a TP as one or more sets of PRB pairs that may convey EPDCCHs. The transmission of an EPDCCH to a UE may be in a single PRB pair (or a few PRB pairs), if a TP has accurate CSI for the UE and can perform Frequency Domain Scheduling (FDS) or beam-forming, or it may be in multiple PRB pairs, possibly also using transmitter antenna diversity, if accurate CSI per PRB pair is not available at a TP. An EPDCCH transmission over a single PRB pair (or few PRB pairs) will be referred to as localized or non-interleaved while an EPDCCH transmission over multiple PRB pairs will be referred to as distributed or interleaved.

An exact search space design for EPDCCHs is not material to the present invention and may or may not follow same principles as for PDCCHs. An EPDCCH consists of respective Enhanced CCEs (ECCEs) and a number of EPDCCH candidates exist for each possible ECCE aggregation level $L_E$, for example, $L_E \in \{1, 2, 4, 8\}$ ECCEs for localized EPDCCHs and $L_E \in \{1, 2, 4, 8, 16\}$ ECCEs for distributed EPDCCHs. An ECCE may or may not have a same size as a CCE and, similar to a CCE, it is formed by Enhanced REGs (EREGs). For example, an ECCE may consist of four EREGs that are formed by nine consecutive REs that, unlike REGs, include REs that may be allocated to transmissions of other signals. EREGs do not include REs allocated to DMRS that are assumed to always be present in a PRB pair configured for EPDCCH transmissions in order for a UE to perform demodulation. Each EREG is contained within a PRB pair. For localized EPDCCH, all EREGs of an ECCE may be in a same PRB pair. For distributed EPDCCH, EREGs of an ECCE are distributed in different PRB pairs.

FIG. 5 illustrates EREG and ECCE structures for a distributed EPDCCH.

Referring to FIG. 5, a PRB pair consists of 12 REs and 14 subframe symbols 510. Excluding only REs allocated to DMRS transmissions in a PRB pair 520, 522, there are 144 remaining REs which are divided among sixteen EREGs 530 with each EREG consisting of nine REs 532 which are sequentially mapped across EREGs in a PRB pair first in a frequency domain and then in a time domain across a subframe symbols. For example, REs for EREG 10 are labeled by 10 540 and REs for EREG 40 are labeled by 14 542. For a distributed EPDCCH transmission over four PRB pairs 550, 552, 554 and 556, each PRB pair contains a respective EREG for an ECCE of a distributed EPDCCH for a total of 16 ECCEs 560. For example, ECCE#4 570 consists of EREG#4 in PRB#0, EREG#8 in PRB#1, EREG#12 in PRB#2, and EREG#0 in PRB#3.

A reason for assigning different EREGs in different PRB pairs to a same ECCE is for improved equivalence of actual sizes among ECCEs since, although each EREG nominally consists of 9 REs (and each ECCE of 36 REs), not all REs can be used for transmitting an EPDCCH as some REs may be used for transmitting other signals or channels such as CRS, CSI-RS, or PDCCH. Mixing EREGs forming an ECCE averages a discrepancy in a number of useful REs in each EREG. Cycling (with wrap around) EREGs in each PRB pair by 4 EREGs relative to a previous PRB pair, as illustrated in FIG. 5, typically improves an equivalence of actual sizes among ECCEs. This determination of an EREG index may be described by Equation (2) as:

$$\text{EREG index} = (k+4 \cdot i) \bmod 16 \quad (2)$$

In Equation (2), k=0, 1, . . . ,15 is an ECCE index and i=0, 1, 2, 3 is an index of a PRB pair containing a respective EREG.

A number of PRB pairs for transmitting EPDCCH in a subframe may depend on a DL operating BW which may range from 6 RBs to 100 RBs. For a maximum of about ⅓ of total PRB pairs in a DL operating BW allocated to EPDCCH transmissions, a number of 2, {2, 4, 6}, and {4, 6, 8} PRB pairs, respectively, can be used to transmit EPD-CCHs for operating BWs of 6, 15, and 25 PRB pairs. For larger operating BWs consisting of 50 or more RBs, a number of PRB pairs allocated to EPDCCH transmissions can be assumed to be a multiple of four.

A symmetry resulting from having four PRB pairs for EPDCCH transmissions, with each PRB pair containing one EREG for one ECCE, does not hold if a number of PRB pairs is not an integer multiple of four. A new mapping of EREGs in each PRB pair is then required subject to a condition that for a distributed EPDCCH transmission a PRB pair contains only one EREG for a respective ECCE in order to optimally exploit a frequency diversity and an interference diversity by distributing EREGs of an EPDCCH in different PRB pairs.

Moreover, when a number of PRB pairs allocated to EPDCCH transmission in a subframe is a multiple of four, an arrangement of respective multiple sets of 4 PRB pairs should be defined taking into account a need to equalize as much as possible ECCEs for distributed EPDCCH transmissions (at least in terms of REs available for transmitting EPDCCHs) and a need to randomize interference across different cells.

In addition to defining a structure of ECCEs in respective PRB pairs for transmitting distributed EPDCCHs, a first subframe symbol for a PDSCH reception should also be defined. Typically, this is same as a first subframe symbol for EPDCCH reception and can be determined by a UE either by decoding a PCFICH or by higher layer configuration. However, it is possible that a UE may receive a PDSCH scheduled either by a PDCCH (at least in a CSS) or by EPDCCH in which case further considerations are needed for determining a first subframe symbol for PDSCH reception.

An additional issue is the determination by a UE of whether or not to use for PDSCH reception one or more PRB pairs within an RBG when the RBG is indicated for PDSCH reception and the one or more PRB pairs are configured to the UE for transmitting EPDCCHs.

Therefore, there is a need to construct ECCEs for transmitting distributed EPDCCHs for a variable, even number of PRB pairs.

There is another need to improve equivalency among ECCEs in terms of a number of REs for transmitting EPDCCHs and for randomizing EPDCCH interference among different cells.

There is another need for determining a first subframe symbol at a UE for a PDSCH reception that may be scheduled either by a PDCCH or by an EPDCCH.

Finally, there is another need for a UE to determine whether to include in a PDSCH reception a PRB pair configured for an EPDCCH transmission when the PRB pair is included in an RBG indicated for the PDSCH reception.

SUMMARY OF THE INVENTION

Accordingly, the present invention has been made to address at least the aforementioned limitations and problems in the prior art and to provide at least the advantages described below.

Accordingly, aspects of the present invention provides methods and apparatus for constructing ECCEs for an EPDCCH, for determining a first symbol for a Physical Downlink Shared CHannel (PDSCH) in a TTI, and for determining whether to exclude from a PDSCH PRB pairs indicated for the PDSCH by control information conveyed by an EPDCCH scheduling the PDSCH.

In accordance with an embodiment of the present invention, a method is provided for a User Equipment (UE) to receive a Physical Downlink Shared CHannel (PDSCH) transmitted by a base station in a serving cell over a Transmission Time Interval (TTI), wherein the PDSCH is scheduled either by a first type Physical Downlink Control CHannel (PDCCH), or by a second type PDCCH, or occurs semi-persistently without scheduling by a PDCCH, wherein the base station transmits the first type PDCCH either in a UE-Common Search Space (UE-CSS) or in a first UE-Dedicated Search Space (UE-DSS) in the serving cell, and wherein the base station transmits the second type PDCCH in a second UE-DSS in the serving cell. The method includes receiving higher layer signaling from the base station that informs of a binary pattern corresponding to a number of TTIs, wherein each binary pattern value for each respective TTI in the number of TTIs indicates to the UE to receive either first type PDCCHs in the first UE-DSS or second type PDCCHs in the second UE-DSS; receiving higher layer signaling from the base station that informs of a parameter "epdcch-StartSymbol" indicating an initial symbol for receiving second type PDCCHs in the second UE-DSS; receiving a physical channel from the base station that conveys a field indicating a duration of $M_{symb}^{DL}$ symbols for receiving first type PDCCHs in the TTI; determining a first symbol in the TTI as "epdcch-StartSymbol" if the binary pattern value for the TTI indicates reception of second type PDCCHs in the second UE-DSS and the PDSCH is scheduled by a second type PDCCH in the second UE-DSS; determining a first symbol in the TTI as $M_{symb}^{DL}+1$ if the binary pattern value for the TTI indicates reception of second type PDCCHs in the TTI and the PDSCH is scheduled by a first type PDCCH in the UE-CSS; determining a first symbol in the TTI, for a semi-persistent PDSCH, as $M_{symb}^{DL}+1$ if the binary pattern value for the TTI indicates reception of first type PDCCHs in the first UE-DSS or as "epdcch-StartSymbol" if the binary pattern value for the TTI indicates reception of second type PDCCHs in the second UE-DSS; and receiving the PDSCH from the first symbol in the TTI until a last symbol of the TTI.

In one embodiment, a method is provided for a base station to transmit a Physical Downlink Shared CHannel (PDSCH) to a User Equipment (UE) in a serving cell over a Transmission Time Interval (TTI), wherein the PDSCH is scheduled either by a first type Physical Downlink Control CHannel (PDCCH), or by a second type PDCCH, or occurs semi-persistently without scheduling by a PDCCH, wherein the base station transmits the first type PDCCH either in a UE-Common Search Space (UE-CSS) or in a first UE-Dedicated Search Space (UE-DSS) in the serving cell, and wherein the base station transmits the second type PDCCH in a second UE-DSS in the serving cell. The method includes transmitting higher layer signaling to the UE that informs of a binary pattern corresponding to a number of TTIs, wherein each binary pattern value for each respective TTI in the number of TTIs indicates to the UE to receive either first type PDCCHs in the first UE-DSS or second type PDCCHs in the second UE-DSS; transmitting higher layer signaling to the UE that informs of a parameter "epdcch-StartSymbol" indicating an initial symbol for receiving second type PDCCHs in the second UE-DSS; transmitting a physical channel that conveys a field indicating a duration of $M_{symb}^{DL}$ symbols for receiving first type PDCCHs in the TTI; determining a first symbol in the TTI as "epdcch-StartSymbol" if the binary pattern value indicates transmission of second type PDCCHs in the second UE-DSS in the TTI and the PDSCH is scheduled by a second type PDCCH in the second UE-DSS; determining a first symbol in the TTI as $M_{symb}^{DL}+1$ if the binary pattern value indicates transmission of second type PDCCHs in the TTI and the PDSCH is scheduled by a first type PDCCH in the UE-CSS; determining a first symbol in the TTI, for a semi-persistent PDSCH, as $M_{symb}^{DL}+1$ if the binary pattern value indicates transmission of first type PDCCHs in the first UE-DSS in the TTI or as "epdcch-StartSymbol" if the binary pattern value indicates transmission of second type PDCCHs in the second UE-DSS in the TTI; and transmitting the PDSCH from the first symbol in the TTI until the last symbol of the TTI.

In accordance with another embodiment of the present invention, a method is provided for a User Equipment (UE) to receive a Physical Downlink Shared CHannel (PDSCH) that is scheduled by a Physical Downlink Control CHannel (PDCCH) transmitted by a base station over first Physical Resource Block (PRB) pairs from a set of PRB pairs that includes second PRB pairs, wherein a PRB pair includes a number of sub-carriers over a Transmission Time Interval (TTI) and wherein the number of second PRB pairs is larger than the number of first PRB pairs. The method includes detecting the PDCCH in the first PRB pairs wherein the PDCCH conveys control information scheduling PDSCH reception in third PRB pairs that include at least one PRB pair from the second PRB pairs that is not in the first PRB pairs; and receiving the PDSCH in the third PRB pairs if the first PRB pairs include only one PRB pair or receiving the PDSCH in the third PRB pairs after excluding the at least one PRB pair if the first PRB pairs include more than one PRB pair.

In accordance with another embodiment of the present invention, a method is provided for a base station to transmit a Physical Downlink Shared CHannel (PDSCH) to a User Equipment (UE), wherein the PDSCH is scheduled by a Physical Downlink Control CHannel (PDCCH) transmitted by the base station over first Physical Resource Block (PRB) pairs from a set of PRB pairs that includes second PRB pairs, wherein a PRB pair includes a number of sub-carriers over a Transmission Time Interval (TTI), and wherein the number of second PRB pairs is larger than the number of first PRB pairs. The method includes transmitting the PDCCH in the first PRB pairs wherein the PDCCH includes control information scheduling the PDSCH transmission in third PRB pairs that include at least one PRB pair from the second PRB pairs that is not in the first PRB pairs; and transmitting the PDSCH in the third PRB pairs if the first PRB pairs include only one PRB pair or transmitting the PDSCH in the third PRB pairs after excluding the at least one PRB pair if the first PRB pairs include more than one PRB pair.

In accordance with another embodiment of the present invention, a User Equipment (UE) apparatus is provided for receiving a Physical Downlink Shared CHannel (PDSCH) transmitted from a base station in a serving cell over a Transmission Time Interval (TTI), wherein the PDSCH reception is scheduled either by a first type Physical Downlink Control CHannel (PDCCH), or by a second type PDCCH, or it occurs semi-persistently without scheduling by a PDCCH, wherein the base station transmits the first type PDCCH either in a UE-Common Search Space (UE-CSS) or in a first UE-Dedicated Search Space (UE-DSS) in the serving cell, and wherein the base station transmits the second type PDCCH in a second UE-DSS in the serving cell. The UE apparatus includes a receiver for receiving from the base station, first higher layer signaling that informs of a binary pattern corresponding to a number of TTIs, wherein each binary pattern value for each respective TTI in the number of TTIs indicates to the apparatus to receive either first type PDCCHs in the first UE-DSS or second type PDCCHs in the second UE-DSS, second higher layer signaling that informs of a parameter "epdcch-StartSymbol", wherein "epdcch-StartSymbol" indicates an initial symbol for receiving second type PDCCHs in the second UE-DSS, a physical channel that conveys a field, wherein the field indicates a duration of $M_{symb}^{DL}$ symbols for receiving first type PDCCHs in the TTI, first type PDCCHs in the UE-CSS and either first type PDCCHs in the first UE-DSS or second type PDCCHs in the second UE-DSS as determined by a binary pattern value for the TTI, and the PDSCH from a first symbol of the TTI until a last symbol of the TTI; and a computing unit for determining the first symbol of the TTI as "epdcch-StartSymbol" if the binary pattern value indicates reception of second type PDCCHs in the second UE-DSS and the PDSCH is scheduled by a second type PDCCH in the second UE-DSS, or as $M_{symb}^{DL}+1$ if the binary pattern value indicates reception of second type PDCCHs in the second UE-DSS and the PDSCH is scheduled by a first type PDCCH in the UE-CSS, or for a semi-persistent PDSCH, as $M_{symb}^{DL}+1$ if the binary pattern value indicates reception of first type PDCCHs in the first UE-DSS or as "epdcch-StartSymbol" if the binary pattern value indicates reception of second type PDCCHs in the second UE-DSS.

In accordance with another embodiment of the present invention, a base station apparatus is provided for transmitting a Physical Downlink Shared CHannel (PDSCH) transmitted to a User Equipment (UE) in a serving cell over a Transmission Time Interval (TTI), wherein the PDSCH reception is scheduled either by a first type Physical Downlink Control CHannel (PDCCH), or by a second type PDCCH, or occurs semi-persistently without scheduling by a PDCCH, wherein the apparatus transmits the first type PDCCH either in a UE-Common Search Space (UE-CSS) or in a first UE-Dedicated Search Space (UE-DSS) in the serving cell, and wherein the apparatus transmits the second type PDCCH in a second UE-DSS in the serving cell. The base station apparatus includes a transmitter for transmitting to the UE, first higher layer signaling that informs of a binary pattern corresponding to a number of TTIs, wherein each binary pattern value for each respective TTI in the number of TTIs indicates to the UE to receive either first type PDCCHs in the first UE-DSS or second type PDCCHs in the second UE-DSS, second higher layer signaling that informs of a parameter "epdcch-StartSymbol", wherein "epdcch-StartSymbol" indicates an initial symbol for receiving second type PDCCHs in the second UE-DSS, a physical channel that conveys a field, wherein the field indicates a duration of $M_{symb}^{DL}$ symbols for receiving first type PDCCHs in the TTI, first type PDCCHs in the UE-CSS and either first type PDCCHs in the first UE-DSS or second type PDCCHs in the second UE-DSS as determined by a binary pattern value for the TTI, and the PDSCH from a first symbol of the TTI until a last symbol of the TTI; and a computing unit for determining the first symbol of the TTI as "epdcch-StartSymbol" if the binary pattern value indicates reception of second type PDCCHs in the second UE-DSS and the PDSCH is scheduled by a second type PDCCH in the second UE-DSS, or as $M_{symb}^{DL}+1$ if the binary pattern value indicates reception of second type PDCCHs in the second UE-DSS and the PDSCH is scheduled by a first type PDCCH in the UE-CSS, or for a semi-persistent PDSCH, as $M_{symb}^{DL}+1$ if the binary pattern value indicates reception of first type PDCCHs in the first UE-DSS or as "epdcch-StartSymbol" if the binary pattern value indicates reception of second type PDCCHs in the second UE-DSS.

In accordance with another embodiment of the present invention, a User Equipment (UE) apparatus is provided for receiving a Physical Downlink Shared CHannel (PDSCH) transmitted from a base station in a serving cell over a Transmission Time Interval (TTI), wherein the PDSCH reception is scheduled either by a first type Physical Downlink Control CHannel (PDCCH), or by a second type PDCCH, or it occurs semi-persistently without scheduling by a PDCCH, wherein the base station transmits the first type PDCCH either in a UE-Common Search Space (UE-CSS) or in a first UE-Dedicated Search Space (UE-DSS) in the serving cell, and wherein the base station transmits the second type PDCCH in a second UE-DSS in the serving cell. The UE apparatus includes a receiver for receiving from the base station first higher layer signaling that informs of a binary pattern corresponding to a number of TTIs, wherein each binary pattern value for each respective TTI in the number of TTIs indicates to the apparatus to receive either first type PDCCHs in the first UE-DSS or second type PDCCHs in the second UE-DSS, second higher layer signaling that informs of a parameter "epdcch-StartSymbol", wherein "epdcch-StartSymbol" indicates an initial symbol for receiving second type PDCCHs in the second UE-DSS, a physical channel that conveys a field, wherein the field indicates a duration of $M_{symb}^{DL}$ symbols for receiving first type PDCCHs in the TTI, first type PDCCHs in the UE-CSS and either first type PDCCHs in the first UE-DSS or second type PDCCHs in the second UE-DSS as determined by a binary pattern value for the TTI, and the PDSCH from a first symbol of the TTI until a last symbol of the TTI; and a computing unit for determining the first symbol of the TTI as "epdcch-StartSymbol" if the binary pattern value indicates reception of second type PDCCHs in the second UE-DSS and the PDSCH is scheduled by a second type PDCCH in the second UE-DSS, or as $M_{symb}^{DL}+1$ if the binary pattern value indicates reception of second type PDCCHs in the second UE-DSS and the PDSCH is scheduled by a first type PDCCH in the UE-CSS, or for a semi-persistent PDSCH, as $M_{symb}^{DL}+1$ if the binary pattern value indicates reception of first type PDCCHs in the first UE-DSS or as "epdcch-StartSymbol" if the binary pattern value indicates reception of second type PDCCHs in the second UE-DSS.

In accordance with another embodiment of the present invention, a base station apparatus is provided for transmitting a Physical Downlink Shared CHannel (PDSCH) transmitted to a User Equipment (UE) in a serving cell over a Transmission Time Interval (TTI), wherein the PDSCH reception is scheduled either by a first type Physical Downlink Control CHannel (PDCCH), or by a second type PDCCH, or occurs semi-persistently without scheduling by a PDCCH, wherein the apparatus transmits the first type PDCCH either in a UE-Common Search Space (UE-CSS) or in a first UE-Dedicated Search Space (UE-DSS) in the serving cell, and wherein the apparatus transmits the second type PDCCH in a second UE-DSS in the serving cell. The base station apparatus includes a transmitter for transmitting to the UE first higher layer signaling that informs of a binary pattern corresponding to a number of TTIs, wherein each binary pattern value for each respective TTI in the number of TTIs indicates to the UE to receive either first type PDCCHs in the first UE-DSS or second type PDCCHs in the second UE-DSS, second higher layer signaling that informs of a parameter "epdcch-StartSymbol", wherein "epdcch-StartSymbol" indicates an initial symbol for receiving second type PDCCHs in the second UE-DSS, a physical channel that conveys a field, wherein the field indicates a duration of $M_{symb}^{DL}$ symbols for receiving first type PDCCHs in the TTI, first type PDCCHs in the UE-CSS and either first type PDCCHs in the first UE-DSS or second type PDCCHs in the second UE-DSS as determined by a binary pattern value for the TTI, and the PDSCH from a first symbol of the TTI until a last symbol of the TTI; and a computing unit for determining the first symbol of the TTI as "epdcch-StartSymbol" if the binary pattern value indicates reception of second type PDCCHs in the second UE-DSS and the PDSCH is scheduled by a second type PDCCH in the second UE-DSS, or as $M_{symb}^{DL}+1$ if the binary pattern value indicates reception of second type PDCCHs in the second UE-DSS and the PDSCH is scheduled by a first type PDCCH in the UE-CSS, or for a semi-persistent PDSCH, as $M_{symb}^{DL}+1$ if the binary pattern value indicates reception of first type PDCCHs in the first UE-DSS or as "epdcch-StartSymbol" if the binary pattern value indicates reception of second type PDCCHs in the second UE-DSS.

In accordance with another embodiment of the present invention, a User Equipment (UE) apparatus is provided for receiving a Physical Downlink Shared CHannel (PDSCH) that is scheduled by a Physical Downlink Control CHannel (PDCCH) transmitted by a base station over first Physical Resource Block (PRB) pairs from a set of PRB pairs that includes second PRB pairs, wherein a PRB pair includes a number of sub-carriers over a Transmission Time Interval (TTI) and wherein the number of second PRB pairs is larger than the number of first PRB pairs, The UE apparatus includes a detector for detecting the PDCCH in the first PRB pairs wherein the PDCCH conveys control information scheduling the PDSCH reception in third PRB pairs that include at least one PRB pair from the second PRB pairs that is not in the first PRB pairs; and a receiver for receiving the PDSCH in the third PRB pairs if the first PRB pairs include only one PRB pair or for receiving the PDSCH in the third PRB pairs after excluding the at least one PRB pair if the first PRB pairs include more than one PRB pair.

In accordance with another embodiment of the present invention, a base station apparatus is provided for transmitting a Physical Downlink Shared CHannel (PDSCH) to a User Equipment (UE), wherein the PDSCH is scheduled by a Physical Downlink Control CHannel (PDCCH) transmitted by the apparatus over first Physical Resource Block (PRB) pairs from a set of PRB pairs that includes second PRB pairs, wherein a PRB pair includes a number of sub-carriers over a Transmission Time Interval (TTI), and wherein the number of second PRB pairs is larger than the number of first PRB pairs. The base station apparatus includes a PDCCH transmitter for transmitting the PDCCH in the first PRB pairs wherein the PDCCH includes control information scheduling the PDSCH in third PRB pairs that include at least one PRB pair from the second PRB pairs that is not in the first PRB pairs; and a PDSCH transmitter for transmitting the PDSCH in the third PRB pairs if the first PRB pairs include only one PRB pair or for transmitting the PDSCH in the third PRB pairs after excluding the at least one PRB pair if the first PRB pairs include more than one PRB pair.

BRIEF DESCRIPTION OF THE DRAWINGS

The above and other aspects, features, and advantages of the present invention will be more apparent from the following detailed description taken in conjunction with the accompanying drawings, in which:

FIG. 6 is a diagram illustrating an ECCE structure for a distributed EPDCCH in two PRB pairs, according to an embodiment of the present invention;

FIG. 7 is a diagram illustrating an ECCE structure for a distributed EPDCCH in six PRB pairs, according to an embodiment of the present invention;

FIG. 8 is a diagram illustrating an ECCE structure for a distributed EPDCCH in eight PRB pairs, according to an embodiment of the present invention;

FIG. 9 is a diagram illustrating an interference randomization method for EPDCCH transmissions by interleaving an indexing of PRB pairs used to transmit EPDCCHs from different TPs, according to an embodiment of the present invention;

FIG. 10 is a diagram illustrating a partitioning of EREGs for allocation to distributed EPDCCHs and to localized EPDCCHs, according to an embodiment of the present invention;

FIG. 11 is a diagram illustrating a TP transmitter for an EPDCCH by determining an ECCE structure, according to an embodiment of the present invention;

FIG. 12 is a diagram illustrating a UE receiver for an EPDCCH by determining an ECCE structure, according to an embodiment of the present invention;

DETAILED DESCRIPTION OF EMBODIMENTS OF THE INVENTION

Figure 1:
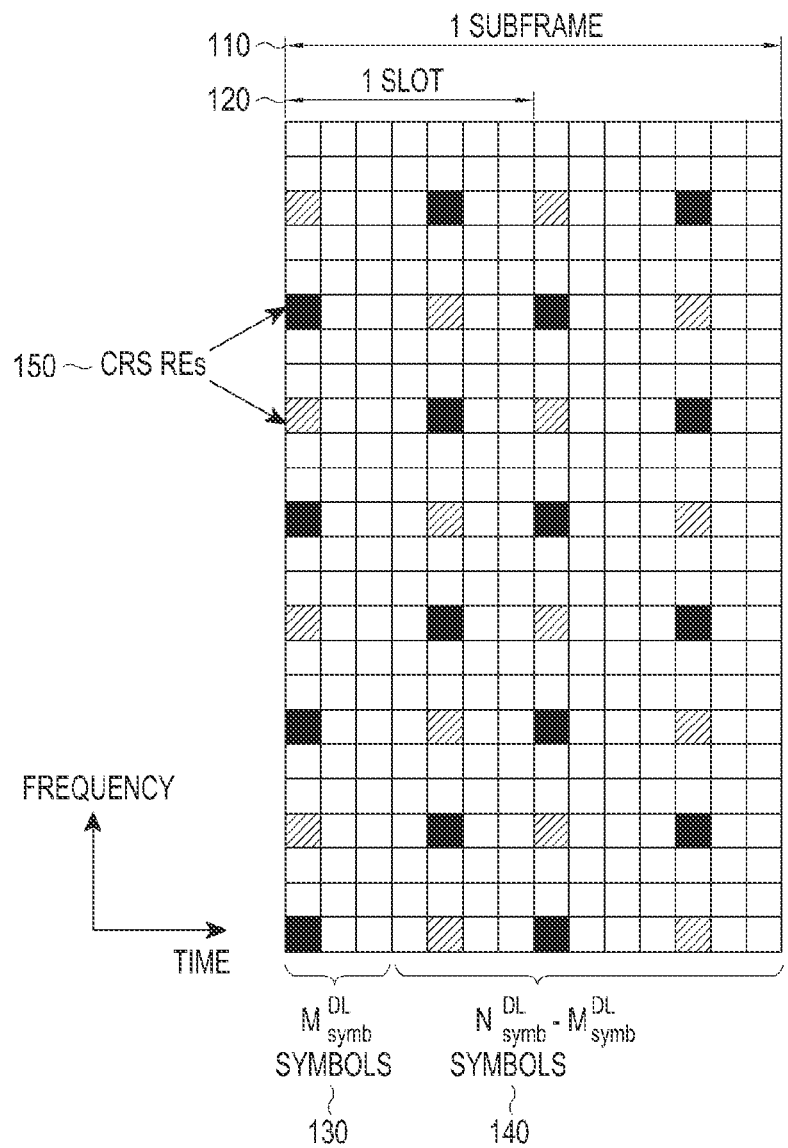
FIG. 1 is a diagram illustrating a structure for a DL TTI.

Various embodiments of the present invention will now be described more fully hereinafter with reference to the accompanying drawings. This present invention may, however, be embodied in many different forms and should not be construed as limited to the embodiments set forth herein. Rather, these embodiments are provided so that this disclosure will be thorough and complete and will fully convey the scope of the present invention to those skilled in the art.

Additionally, although the embodiments of the present invention will be described below with reference to Orthogonal Frequency Division Multiplexing (OFDM), they also are applicable to all Frequency Division Multiplexing (FDM) transmissions in general, and to Discrete Fourier Transform (DFT)-spread OFDM in particular.

The present invention considers methods and apparatus for constructing ECCEs for transmitting EPDCCHs from a TP and detecting EPDCCHs for an even number of PRB pairs subject to maximizing equivalency among ECCEs with respect to respective numbers of REs that can be used to transmit EPDCCHs, and providing interference randomization for transmissions of EPDCCHs from different TPs while allowing multiplexing of localized EPDCCHs and distributed EPDCCHs in a same PRB pair, for determining a first subframe symbol for a PDSCH reception depending on whether it is scheduled by a PDCCH or by an EPDCCH or it semi-persistent, and for determining whether to include PRB pairs for a PDSCH when a respective resource allocation indicates the PRB pairs and a UE does not detect EPDCCH in the PRB pairs.

A first embodiment of the present invention considers a structure of ECCEs for a distributed EPDCCH transmission depending on a number of respective PRB pairs. An ECCE is assumed to consist of 4 EREGs but the objects of the first embodiment can be directly extended for a different number of EREGs per ECCE.

A first aspect of the first embodiment provides a definition of a structure of ECCEs for 2 PRB pairs. Considering that a number of EREGs per PRB pair is 16 and that a number of EREGs in an ECCE is 4, a number of ECCEs over 2 PRB pairs is 8. The present invention considers that properties associated with a structure of ECCEs for 4 PRB pairs are maintained in case of 2 PRB pairs. In particular, considering that EREGs with a same index are equivalent regardless of a PRB pair index (same number and location of REs used for transmission of other signals is assumed in each PRB pair), a same ordering of EREGs for constructing different ECCEs is applied as for the case of 4 PRB pairs in order to improve equivalency among ECCEs in terms of respective REs that can be used for EPDCCH transmissions.

Figure 6:
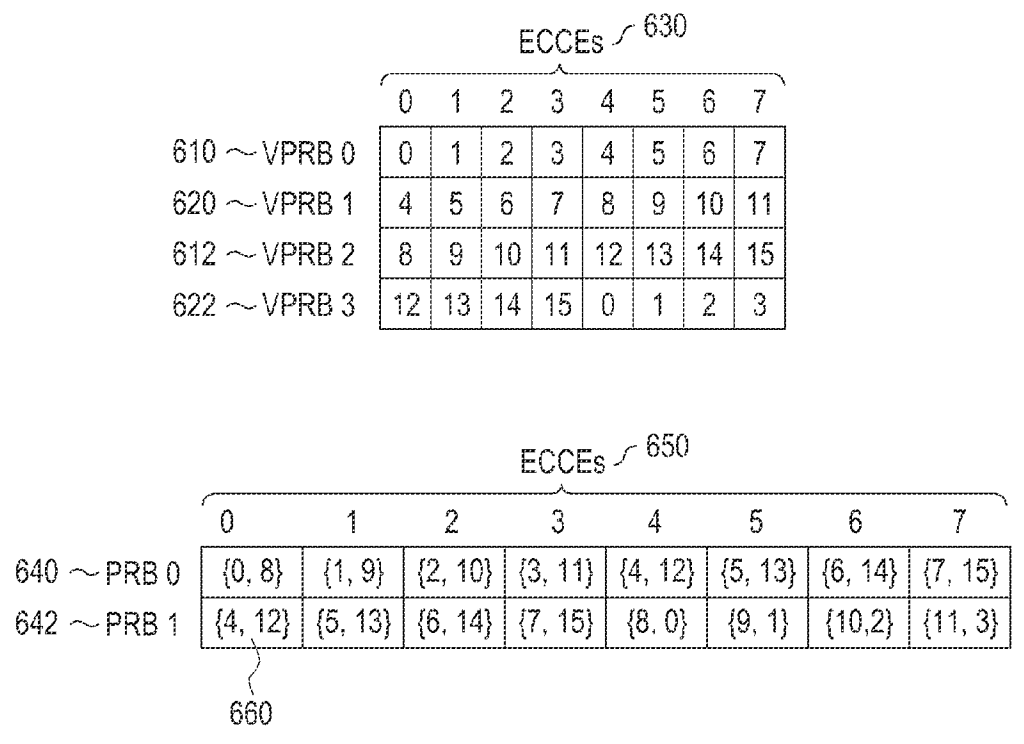

FIG. 6 illustrates a structure for ECCEs for a distributed EPDCCH in two PRB pairs.

Referring to FIG. 6, a first method for constructing ECCEs for a distributed EPDCCH transmission over two PRB pairs splits respective EREGs in a PRB pair into two equal sets of successive EREGs. Each set of EREGs may be viewed as EREGs in a virtual PRB pair consisting of 8 EREGs. Therefore, a configuration of 4 virtual PRB pairs, 610, 620, 612, and 622 may be obtained in this manner where a first virtual PRB pair contains a first set of EREGs from PRB pair 0, a second virtual PRB pair contains a first set of EREGs from PRB pair 1, a third virtual PRB pair contains a second set of EREGs from PRB pair 0, and a fourth virtual PRB pair contains a second set of EREGs from PRB pair 1. A number of 8 ECCEs 630 is obtained in this manner, each having a same structure as an ECCE with a same index in case four PRB pairs are used to transmit a distributed EPDCCH. It is noted that any permutation of an order of PRB pairs (or of virtual PRB pairs) produces a valid ECCE structure. For example, in FIG. 6, instead of allocating each EREG of an ECCE in an order of {virtual PRB (VPRB) 0, VPRB 1, VPRB 2, VPRB 3}, resulting to EREGs {0, 4, 8, 12} for ECCE 0, each EREG can be allocated in any other order of virtual PRB pairs such as {VPRB 0, VPRB 2, VPRB 1, VPRB 3}, resulting to EREGs {0, 8, 4, 12} for ECCE 0, provided that a same order is used for all ECCEs.

A second method for constructing ECCEs for a distributed EPDCCH transmission over two PRB pairs 640, 642, is to group two EREGs per PRB pair and again obtain 8 ECCEs 650. For example, a first ECCE 660 may be obtained by EREG 0 and EREG 1 from a first PRB pair and by EREG 4 and EREG 5 from a second PRB pair.

With an ECCE structure as for the first method in FIG. 6, Equation (2) can again be used to determine an EREG index in the case of 2 PRB pairs with a re-interpretation of i=0, 1, 2, 3 being an index of a virtual PRB pair (instead of an actual PRB pair) and k=0, 1, . . . , 7 (instead of k=0, 1, . . . ,15). With an ECCE structure as for the second method in FIG. 6, a pair of EREG indexes for each ECCE in a respective PRB pair may be obtained as Equation (3):

$$\text{Pair of EREG indexes} = \{(k+4 \cdot i) \bmod 8, (k+4 \cdot i+8) \bmod 16\} \quad (3)$$

In Equation (3), k=0, 1, . . . , 7 is an ECCE index and i=0, 1 is an index of a PRB pair containing a respective pair of EREGs.

Therefore, for a set of $N_{RB}$ PRB pairs and for a same number of EREGs per PRB pair and a same number of EREGs per ECCE, an EREG-to-ECCE mapping for a set of $N_{RB}/2$ PRB pairs is obtained from the EREG-to-ECCE mapping for the set of $N_{RB}$ PRB pairs wherein EREGs for an ECCE in PRB pairs i and i+$N_{RB}/2$, i=0, . . . , $N_{RB}/2-1$, from the set of $N_{RB}$ PRB pairs are in a same PRB pair i from the set of $N_{RB}/2$ PRB pairs (ECCEs that include same EREGs in each PRB pair from the set of $N_{RB}/2$ PRB pairs are treated as being a same ECCE).

A second aspect of the first embodiment defines a structure of ECCEs for 6 PRB pairs. Considering that a number of EREGs per PRB pair is 16 and that a number of EREGs in an ECCE is 4, a number of ECCEs over 6 PRB pairs is 24. Unlike the case of 2 PRB pairs or 4 PRB pairs where a number of EREGs in a PRB pair is an integer multiple of a number of ECCEs, this does not apply in case of 6 PRB pairs and therefore a direct extension for an ECCE structure for 4 PRB pairs to 6 PRB pairs will lead to a same EREG in a same PRB pair assigned to different ECCEs. This collision of EREG assignments can be resolved by extending an ECCE structure in case of 4 PRB pairs in repetitions of 8 ECCEs since 8 is the largest common denominator for 16 and 24. Therefore, a determination of an EREG index should consider a respective ECCE index using a "mod 8" operation. Moreover, as a number of 6 PRB pairs do not evenly divide with a number 4 of ECCEs per PRB pair, virtual PRB pairs may again be introduced in describing a determination of an EREG index.

Figure 7:
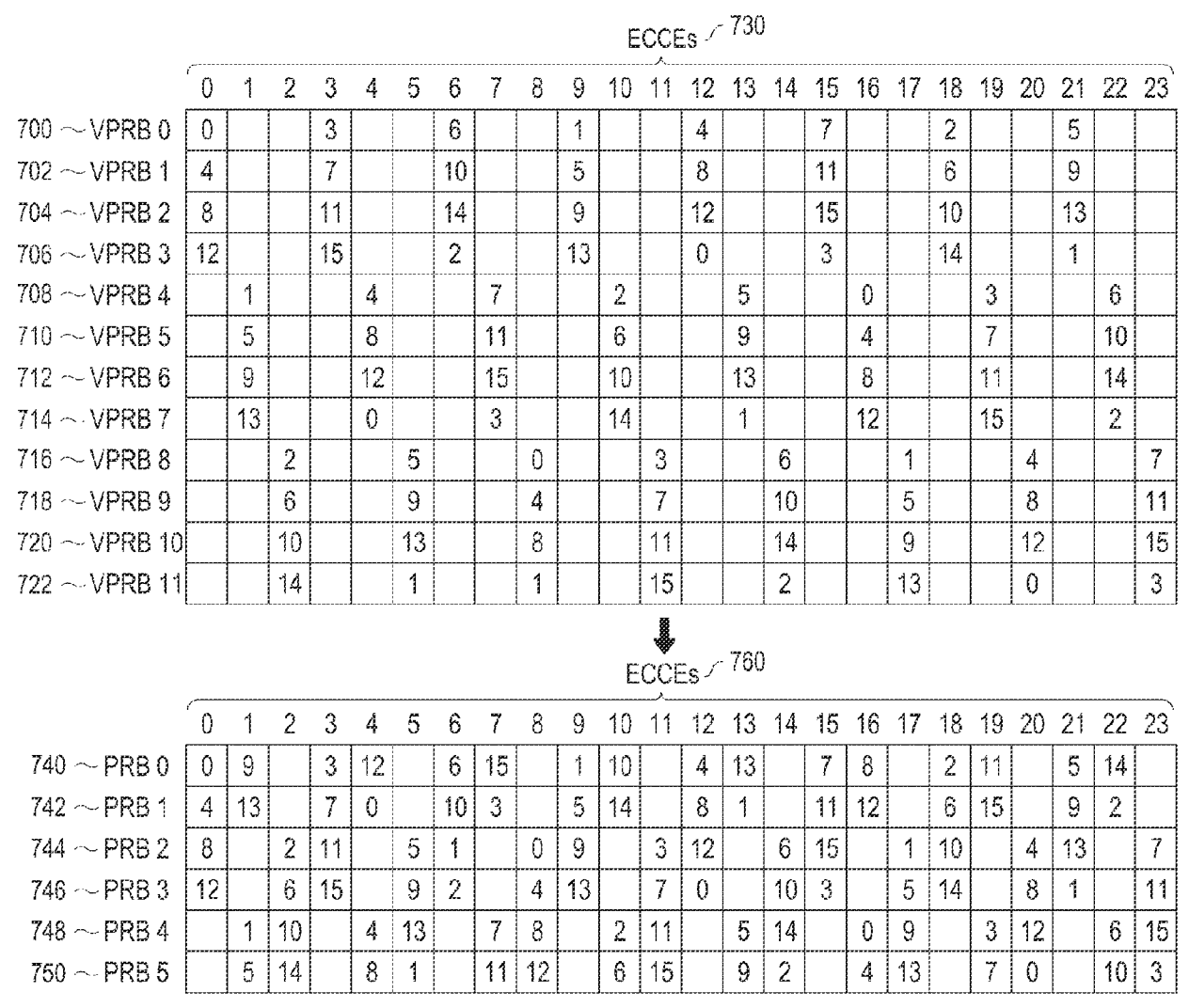

FIG. 7 illustrates a structure for ECCEs for a distributed EPDCCH in six PRB pairs.

Referring to FIG. 7, twelve virtual PRB pairs (which evenly divide with four ECCEs per PRB pair) 700, 702, 704, 706, 708, 710, 712, 714, 716, 718, 720 and 722 are constructed by a single repetition of actual PRB pairs. A first six virtual PRB pairs are the six PRB pairs and a second six virtual PRB pairs are again the six PRB pairs. A number of 24 ECCEs 730 is obtained by cycling through ECCEs constructed as in FIG. 5 in a sequential manner. An equivalent allocation of EREGs in the 6 PRB pairs 740, 742, 744, 746, 748 and 750 may then be directly obtained for a number of 24 ECCEs 760. An allocation of ECCEs to PRB pairs is such that for an ECCE aggregation level $L_E \in \{1, 2, 4, 8\}$ ECCEs, a distribution of EREGs is maximally in different PRB pairs.

With a structure as illustrated in FIG. 7 for six PRB pairs, a determination of an EREG index may be described using Equation (4):

$$\text{EREG index} = (k \bmod 8 + 4 \cdot i) \bmod 16 \quad (4)$$

In Equation (4), k=0, 1, . . . , 23 is an ECCE index and i=0, 1, 2, 3, 4, 5 is an index of a PRB pair containing a respective EREG.

A third object of the first embodiment is a definition of a structure of ECCEs for a number of PRB pairs that is a multiple of 4. A direct repetition of a structure as in FIG. 5 may apply but a consequence would be that a same set of EREGs is used for ECCE aggregation levels larger than one ECCE thereby reducing a probability that such ECCE aggregation levels, or an ECCE including eight EREGs, contain a largely same number of REs available for transmitting EPDCCHs regardless of which ECCE indexes, or respective EREG indexes, are included in an aggregation level.

Figure 5:
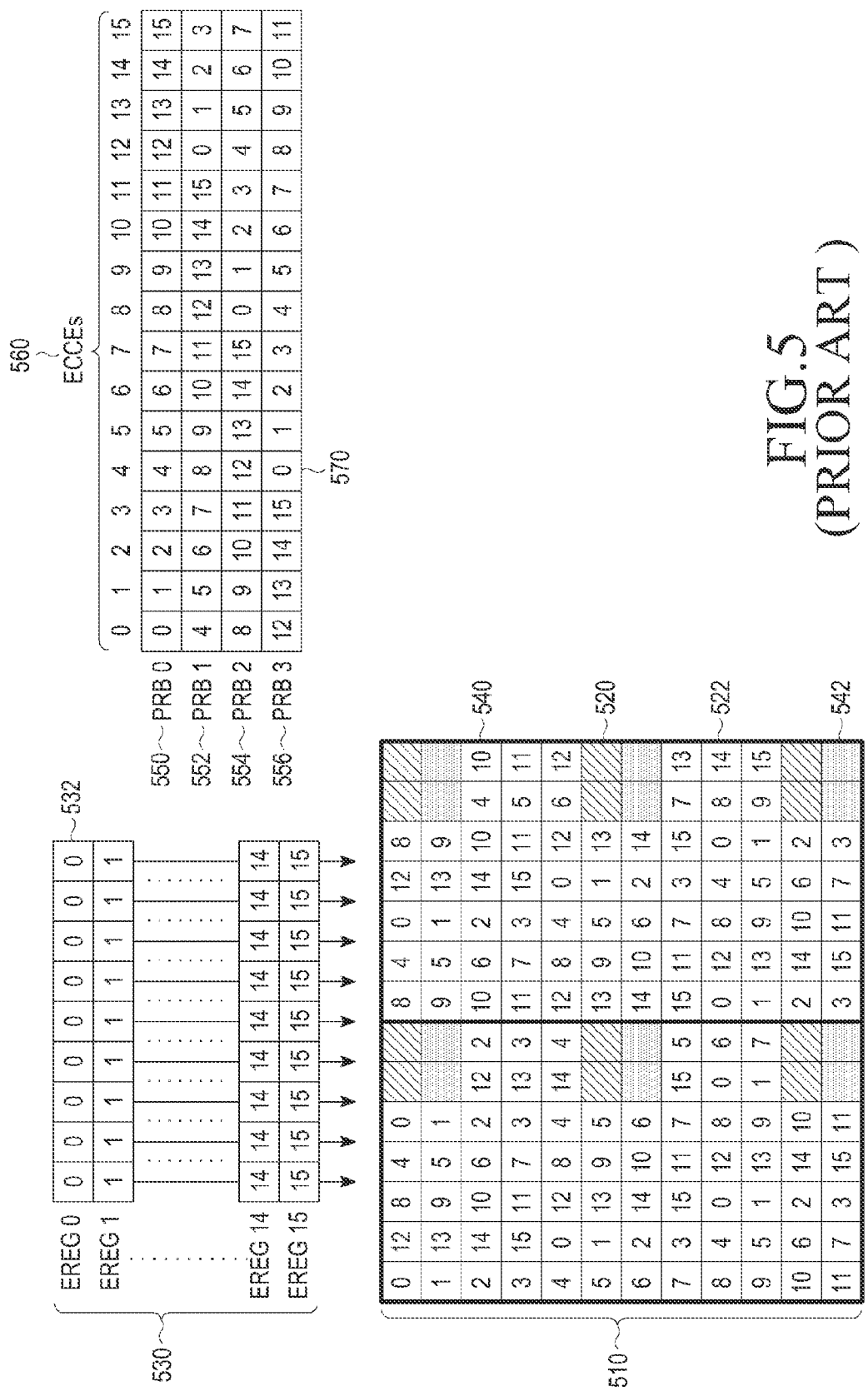
FIG. 5 is a diagram illustrating EREG and ECCE structures for a distributed EPDCCH in four PRB pairs.

In order to maximize a use of different EREGs for ECCE aggregation levels larger than one ECCE when a multiple of 4 PRB pairs is used to transmit distributed EPDCCHs, or equivalently to maximize a use of different EREGs for ECCEs that include eight EREGs, an ECCE allocation in a first set of 4 PRB pairs may be as in FIG. 5 while an ECCE allocation in at least a second set of 4 PRB pairs may be a shifted version of an ECCE allocation in a first set of 4 PRB pairs.

FIG. 8 illustrates a structure for ECCEs for a distributed EPDCCH in eight PRB pairs.

Referring to FIG. 8, for eight PRB pairs consisting of a first set of 4 PRB pairs 800, 802, 804, and 806 and of a second set of PRB pairs 810, 812, 814, and 816, a first set of ECCEs 820 with even indexes is constructed from the first set of PRB pairs and a second set of ECCEs 830 with odd indexes is constructed from the second set of PRB pairs. A shift is applied to an ECCE distribution in the second set of PRB pairs so that EREGs contained in a first two ECCEs in the first set of PRB pairs 840 are contained in a last two ECCEs in the second set of PRB pairs 850.

A determination of an EREG index in a first set of PRB pairs containing ECCEs with an even index may be described as in Equation (5):

$$\text{EREG index} = (k_0/2 + N_{EREG}^{ECCE} \cdot i_0) \bmod (N_{EREG}^{ECCE} \cdot N_{ECCE}^{RB}) \quad (5)$$

Further, a determination of an EREG index in a second set of PRB pairs containing ECCEs with odd index may be described as in Equation (6):

$$\text{EREG index} = ((k_1-1)/2 + N_{EREG}^{ECCE} \cdot (i_1 - N_{EREG}^{ECCE}) + N_{EREG}^{ECCE}/2) \bmod (N_{EREG}^{ECCE} \cdot N_{ECCE}^{RB}) \quad (6)$$

In Equations (5) and (6), $k_0=0, 2, \ldots, 30$ is an even ECCE index, $k_1=1, 3, \ldots, 31$ is an odd ECCE index, $i_0=0, 1, 2, 3$ is an index of a PRB pair in a first set of PRB pairs containing a respective EREG, and $i_1=4, 5, 6, 7$ is an index of a PRB pair in a second set of PRB pairs containing a respective EREG. Even through a shift of 2 ECCEs is considered, a same approach may be readily extended to other ECCE shift values such as 1 ECCE or 3 ECCEs.

The previous objects of the first embodiment were described assuming that an ECCE consists of 4 EREGs. It is also possible that an ECCE consists of 8 EREGs. In this case, a same ECCE structure as for an ECCE consisting of 4 EREGs may be used by jointly considering 2 ECCEs as a single ECCE. Therefore, for 8 EREGs per ECCE, EREGs for ECCE/may be the same as EREGs of ECCE 2k, 2k+1 in case of 4 EREGs per ECCE.

Denoting by $N_{EREG}^{ECCE}$ the number of EREGs per ECCE (for example, $N_{EREG}^{ECCE}=4$ or $N_{EREG}^{ECCE}=8$), by $N_{ECCE}^{RB}=16/N_{EREG}^{ECCE}$ the number of ECCEs per PRB pair, the EREG to ECCE mapping and PRB pair mapping for $N_{RB}$ PRB pairs for an EPDCCH set can be combined as in Equation (7):

$$ECCE\ k = \quad (7)$$

$$\begin{cases} EREG\#: \{k + j \cdot N_{ECCE}^{RB} + \lfloor k/(N_{EREG}^{ECCE} \cdot N_{ECCE}^{RB}) \rfloor\} \bmod (N_{EREG}^{ECCE} \cdot N_{ECCE}^{RB}) \\ PRBPair\#: (k \cdot N_{ECCE}^{RB} + j) \bmod N_{RB} \\ j = 0, 1, \ldots, N_{EREG}^{ECCE} - 1 \end{cases}$$

Therefore, the EREG to ECCE mappings for $N_{RB}=2, 4, 8$ and $N_{EREG}^{ECCE}=4, 8$ are as in Tables 1-6 and properties of the EREG to ECCE mapping can be summarized as follows. EREGs belong in one of the following four eREG groups: EREG group#0={eREG#0, eREG#4, eREG#8, eREG#12} (having eREG#0 as its first element), EREG group#1={eREG#1, eREG#5, eREG#9, eREG#13} (having eREG#1 as its first element), EREG group#2={eREG#2, eREG#6, eREG#10, eREG#14} (having eREG#2 as its first element), and EREG group#3={eREG#3, eREG#7, eREG#11, eREG#15} (having eREG#3 as its first element). When an ECCE includes four EREGs, it is formed by an EREG group. When an ECCE includes eight EREGs, it is formed by a pair of EREG groups and these pairs of EREG groups are either EREG group#0 and EREG group#2 or EREG group#1 and EREG group#3 (for example, as illustrated in FIG. 8). For each EREG group pair, an ECCE is formed by a cyclic permutation of the EREGs within a group, such as {0, 4, 8, 12}, {4, 8, 12, 0}, {8, 12, 0, 4}, {12, 0, 4, 8} for EREG group#0.

TABLE 1

$N_{RB} = 2, N_{ECCE}^{RB} = 4\ (N_{EREG}^{ECCE} = 4)$

| | PRB #0 | PRB #1 | PRB #0 | PRB #1 |
|---|---|---|---|---|
| eCCE#0 | eREG#0 | eREG#4 | eREG#8 | eREG#12 |
| eCCE#1 | eREG#1 | eREG#5 | eREG#9 | eREG#13 |
| eCCE#2 | eREG#2 | eREG#6 | eREG#10 | eREG#14 |
| eCCE#3 | eREG#3 | eREG#7 | eREG#11 | eREG#15 |
| eCCE#4 | eREG#4 | eREG#8 | eREG#12 | eREG#0 |
| eCCE#5 | eREG#5 | eREG#9 | eREG#13 | eREG#1 |
| eCCE#6 | eREG#6 | eREG#10 | eREG#14 | eREG#2 |
| eCCE#7 | eREG#7 | eREG#11 | eREG#15 | eREG#3 |

TABLE 2

$N_{RB} = 2, N_{ECCE}^{RB} = 2\ (N_{EREG}^{ECCE} = 8)$

| | PRB #0 | PRB #1 | PRB #0 | PRB #1 | PRB #0 | PRB #1 | PRB #0 | PRB #1 |
|---|---|---|---|---|---|---|---|---|
| eCCE#0 | eREG#0 | eREG#2 | eREG#4 | eREG#6 | eREG#8 | eREG#10 | eREG#12 | eREG#14 |
| eCCE#1 | eREG#1 | eREG#3 | eREG#5 | eREG#7 | eREG#9 | eREG#11 | eREG#13 | eREG#15 |
| eCCE#2 | eREG#2 | eREG#4 | eREG#6 | eREG#8 | eREG#10 | eREG#12 | eREG#14 | eREG#0 |
| eCCE#3 | eREG#3 | eREG#5 | eREG#7 | eREG#9 | eREG#11 | eREG#13 | eREG#15 | eREG#1 |

TABLE 3

$N_{RB} = 4, N_{ECCE}^{RB} = 4\ (N_{EREG}^{ECCE} = 4)$

| | PRB #0 | PRB #1 | PRB #2 | PRB #3 |
|---|---|---|---|---|
| eCCE#0 | eREG#0 | eREG#4 | eREG#8 | eREG#12 |
| eCCE#1 | eREG#1 | eREG#5 | eREG#9 | eREG#13 |
| eCCE#2 | eREG#2 | eREG#6 | eREG#10 | eREG#14 |
| eCCE#3 | eREG#3 | eREG#7 | eREG#11 | eREG#15 |
| eCCE#4 | eREG#4 | eREG#8 | eREG#12 | eREG#0 |
| eCCE#5 | eREG#5 | eREG#9 | eREG#13 | eREG#1 |
| eCCE#6 | eREG#6 | eREG#10 | eREG#14 | eREG#2 |

TABLE 3-continued $N_{RB} = 4, N_{ECCE}^{RB} = 4 (N_{EREG}^{ECCE} = 4)$

|  | PRB #0 | PRB #1 | PRB #2 | PRB #3 |
|---|---|---|---|---|
| eCCE#7 | eREG#7 | eREG#11 | eREG#15 | eREG#3 |
| eCCE#8 | eREG#8 | eREG#12 | eREG#0 | eREG#4 |
| eCCE#9 | eREG#9 | eREG#13 | eREG#1 | eREG#5 |
| eCCE#10 | eREG#10 | eREG#14 | eREG#2 | eREG#6 |
| eCCE#11 | eREG#11 | eREG#15 | eREG#3 | eREG#7 |
| eCCE#12 | eREG#12 | eREG#0 | eREG#4 | eREG#8 |
| eCCE#13 | eREG#13 | eREG#1 | eREG#5 | eREG#9 |
| eCCE#14 | eREG#14 | eREG#2 | eREG#6 | eREG#10 |
| eCCE#15 | eREG#15 | eREG#3 | eREG#7 | eREG#11 |

TABLE 4

$N_{RB} = 4, N_{ECCE}^{RB} = 2 (N_{EREG}^{ECCE} = 8)$

|  | PRB #0 | PRB #1 | PRB #2 | PRB #3 | PRB #0 | PRB #1 | PRB #2 | PRB #3 |
|---|---|---|---|---|---|---|---|---|
| eCCE#0 | eREG#0 | eREG#2 | eREG#4 | eREG#6 | eREG#8 | eREG#10 | eREG#12 | eREG#14 |
| eCCE#1 | eREG#5 | eREG#7 | eREG#1 | eREG#3 | eREG#13 | eREG#15 | eREG#9 | eREG#11 |
| eCCE#2 | eREG#2 | eREG#4 | eREG#6 | eREG#8 | eREG#10 | eREG#12 | eREG#14 | eREG#0 |
| eCCE#3 | eREG#7 | eREG#9 | eREG#3 | eREG#5 | eREG#15 | eREG#1 | eREG#11 | eREG#13 |
| eCCE#4 | eREG#4 | eREG#6 | eREG#8 | eREG#10 | eREG#12 | eREG#14 | eREG#0 | eREG#2 |
| eCCE#5 | eREG#9 | eREG#11 | eREG#5 | eREG#7 | eREG#1 | eREG#3 | eREG#13 | eREG#15 |
| eCCE#6 | eREG#6 | eREG#8 | eREG#10 | eREG#12 | eREG#14 | eREG#0 | eREG#2 | eREG#4 |
| eCCE#7 | eREG#11 | eREG#13 | eREG#7 | eREG#9 | eREG#3 | eREG#5 | eREG#15 | eREG#1 |

TABLE 5

$N_{RB} = 8, N_{ECCE}^{RB} = 4 (N_{EREG}^{ECCE} = 4)$

|  | PRB #0 | PRB #1 | PRB #2 | PRB #3 | PRB #4 | PRB #5 | PRB #6 | PRB #7 |
|---|---|---|---|---|---|---|---|---|
| eCCE#0 | eREG#0 | eREG#4 | eREG#8 | eREG#12 | | | | |
| eCCE#1 | | | | | eREG#1 | eREG#5 | eREG#9 | eREG#13 |
| eCCE#2 | eREG#2 | eREG#6 | eREG#10 | eREG#14 | | | | |
| eCCE#3 | | | | | eREG#3 | eREG#7 | eREG#11 | eREG#15 |
| eCCE#4 | eREG#4 | eREG#8 | eREG#12 | eREG#0 | | | | |
| eCCE#5 | | | | | eREG#5 | eREG#9 | eREG#13 | eREG#1 |
| eCCE#6 | eREG#6 | eREG#10 | eREG#14 | eREG#2 | | | | |
| eCCE#7 | | | | | eREG#7 | eREG#11 | eREG#15 | eREG#3 |
| eCCE#8 | eREG#8 | eREG#12 | eREG#0 | eREG#4 | | | | |
| eCCE#9 | | | | | eREG#9 | eREG#13 | eREG#1 | eREG#5 |
| eCCE#10 | eREG#10 | eREG#14 | eREG#2 | eREG#6 | | | | |
| eCCE#11 | | | | | eREG#11 | eREG#15 | eREG#3 | eREG#7 |
| eCCE#12 | eREG#12 | eREG#0 | eREG#4 | eREG#8 | | | | |
| eCCE#13 | | | | | eREG#13 | eREG#1 | eREG#5 | eREG#9 |
| eCCE#14 | eREG#14 | eREG#2 | eREG#6 | eREG#10 | | | | |
| eCCE#15 | | | | | eREG#15 | eREG#3 | eREG#7 | eREG#11 |
| eCCE#16 | eREG#1 | eREG#5 | eREG#9 | eREG#13 | | | | |
| eCCE#17 | | | | | eREG#2 | eREG#6 | eREG#10 | eREG#14 |
| eCCE#18 | eREG#3 | eREG#7 | eREG#11 | eREG#15 | | | | |
| eCCE#19 | | | | | eREG#4 | eREG#8 | eREG#12 | eREG#0 |
| eCCE#20 | eREG#5 | eREG#9 | eREG#13 | eREG#1 | | | | |
| eCCE#21 | | | | | eREG#6 | eREG#10 | eREG#14 | eREG#2 |
| eCCE#22 | eREG#7 | eREG#11 | eREG#15 | eREG#3 | | | | |
| eCCE#23 | | | | | eREG#8 | eREG#12 | eREG#0 | eREG#4 |
| eCCE#24 | eREG#9 | eREG#13 | eREG#1 | eREG#5 | | | | |
| eCCE#25 | | | | | eREG#10 | eREG#14 | eREG#2 | eREG#6 |
| eCCE#26 | eREG#11 | eREG#15 | eREG#3 | eREG#7 | | | | |
| eCCE#27 | | | | | eREG#12 | eREG#0 | eREG#4 | eREG#8 |
| eCCE#28 | eREG#13 | eREG#1 | eREG#5 | eREG#9 | | | | |
| eCCE#29 | | | | | eREG#14 | eREG#2 | eREG#6 | eREG#10 |
| eCCE#30 | eREG#15 | eREG#3 | eREG#7 | eREG#11 | | | | |
| eCCE#31 | | | | | eREG#0 | eREG#4 | eREG#8 | eREG#12 |

TABLE 6

$N_{RB} = 8, N_{ECCE}^{RB} = 2 (N_{EREG}^{ECCE} = 8)$

|  | PRB #0 | PRB #1 | PRB #2 | PRB #3 | PRB #4 | PRB #5 | PRB #6 | PRB #7 |
|---|---|---|---|---|---|---|---|---|
| eCCE#0 | eREG#0 | eREG#2 | eREG#4 | eREG#6 | eREG#8 | eREG#10 | eREG#12 | eREG#14 |
| eCCE#1 | eREG#13 | eREG#15 | eREG#1 | eREG#3 | eREG#5 | eREG#7 | eREG#9 | eREG#11 |
| eCCE#2 | eREG#10 | eREG#12 | eREG#14 | eREG#0 | eREG#2 | eREG#4 | eREG#6 | eREG#8 |
| eCCE#3 | eREG#7 | eREG#9 | eREG#11 | eREG#13 | eREG#15 | eREG#1 | eREG#3 | eREG#5 |

TABLE 6-continued $N_{RB} = 8, N_{ECCE}{}^{RB} = 2 (N_{EREG}{}^{ECCE} = 8)$

|  | PRB #0 | PRB #1 | PRB #2 | PRB #3 | PRB #4 | PRB #5 | PRB #6 | PRB #7 |
|---|---|---|---|---|---|---|---|---|
| eCCE#4 | eREG#4 | eREG#6 | eREG#8 | eREG#10 | eREG#12 | eREG#14 | eREG#0 | eREG#2 |
| eCCE#5 | eREG#1 | eREG#3 | eREG#5 | eREG#7 | eREG#9 | eREG#11 | eREG#13 | eREG#15 |
| eCCE#6 | eREG#14 | eREG#0 | eREG#2 | eREG#4 | eREG#6 | eREG#8 | eREG#10 | eREG#12 |
| eCCE#7 | eREG#11 | eREG#13 | eREG#15 | eREG#1 | eREG#3 | eREG#5 | eREG#7 | eREG#9 |
| eCCE#8 | eREG#8 | eREG#10 | eREG#12 | eREG#14 | eREG#0 | eREG#2 | eREG#4 | eREG#6 |
| eCCE#9 | eREG#5 | eREG#7 | eREG#9 | eREG#11 | eREG#13 | eREG#15 | eREG#1 | eREG#3 |
| eCCE#10 | eREG#2 | eREG#4 | eREG#6 | eREG#8 | eREG#10 | eREG#12 | eREG#14 | eREG#0 |
| eCCE#11 | eREG#15 | eREG#1 | eREG#3 | eREG#5 | eREG#7 | eREG#9 | eREG#11 | eREG#13 |
| eCCE#12 | eREG#12 | eREG#14 | eREG#0 | eREG#2 | eREG#4 | eREG#6 | eREG#8 | eREG#10 |
| eCCE#13 | eREG#9 | eREG#11 | eREG#13 | eREG#15 | eREG#1 | eREG#3 | eREG#5 | eREG#7 |
| eCCE#14 | eREG#6 | eREG#8 | eREG#10 | eREG#12 | eREG#14 | eREG#0 | eREG#2 | eREG#4 |
| eCCE#15 | eREG#3 | eREG#5 | eREG#7 | eREG#9 | eREG#11 | eREG#13 | eREG#15 | eREG#1 |

For an ECCE of a localized EPDCCH formed by $N_{EREG}{}^{ECCE}$ EREGs, there are $N_{ECCE}{}^{RB}$ ECCEs per PRB pair. ECCE k, k=0, ..., $N_{RB} \cdot N_{ECCE}{}^{RB}-1$, in PRB pair $\lfloor k/N_{ECCE}{}^{RB} \rfloor$, results by aggregating EREGs as in Equation (8):

$$ECCE\ k = \begin{cases} EREG\#: \{k + jN_{ECCE}^{RB}\} \mod(N_{EREG}^{ECCE} \cdot N_{ECCE}^{RB}) \\ PRBPair\#: \lfloor k/N_{ECCE}^{RB} \rfloor \\ j = 0, 1, \ldots, N_{EREG}^{ECCE} - 1 \end{cases} \quad (8)$$

The ECCE indexing in Equation (8) is first sequentially within a PRB pair and then across PRB pairs. For example, for $N_{ECCE}{}^{RB}=4$ ECCEs per PRB pair, PRB pair 0 contains ECCEs 0, 1, 2, and 3. If ECCEs are first sequentially indexed across PRB pairs (e.g. PRB pair 0 contains ECCE 0, PRB pair 1 contains ECCE 1, etc.) then, for $N_{RB}$ PRB pairs, ECCE k in PRB pair k mod $N_{RB}$ results by aggregating EREGs as in Equation (9):

$$ECCE\ k = \begin{cases} EREG\#: \{\lfloor k/N_{RB} \rfloor + jN_{ECCE}^{RB}\} \\ PRBPair\#: k \mod N_{RB} \\ j = 0, 1, \ldots, N_{EREG}^{ECCE} - 1 \end{cases} \quad (9)$$

As for the case of ECCEs for distributed EPDCCH transmissions, the EREG to ECCE mapping and PRB pair mapping in Equation (8) or Equation (9) maximizes the use of different EREGs for ECCE aggregation levels larger than one, or when an ECCE includes eight EREGs. This minimizes a difference among aggregated ECCEs, or individual ECCEs for eight EREGs per ECCE, such as for example the difference of ECCE 1 aggregated with ECCE 2 and ECCE 3 aggregated with ECCE 4, in terms of a number of available REs for transmitting EPDCCH.

The present invention has so far assumed that the indexing of PRB pairs is in the order of their ascending frequency in a system BW. However, this does not need to be the case for the objects of the present invention and the indexing of PRB pairs for a respective EREG or ECCE mapping may be re-arranged in order to increase a distance of successive PRB pairs in frequency. For example, for 8 PRB pairs, if a respective indexing in a system BW according to ascending frequency is as {PRB0, PRB1, PRB2, PRB3, PRB4, PRB5, PRB6, PRB7}, an indexing of PRB pairs for EREG or ECCE mapping can be as {PRB0, PRB3, PRB6, PRB1, PRB4, PRB7, PRB2, PRB5} or {PRB0, PRB2, PRB4, PRB6, PRB1, PRB3, PRB5, PRB7} any other permutation/shift that increases a frequency separation between successive PRB pairs for mapping EREGs or ECCEs in order to increase a frequency diversity experienced by a distributed EPDCCH transmission or increase the frequency selectivity opportunities for a localized EPDCCH transmission.

A fourth object of the first embodiment is a randomization of interference experienced by an EPDCCH transmission from a TP. Regardless of a number of PRB pairs used to transmit a distributed EPDCCH, an order of PRB pairs may be specific to a respective TP. A UE may be informed by higher layer signaling of a bit-map for PRB pairs, among a total number of PRB pairs in a DL BW, used to transmit EPDCCHs where a one-to-one correspondence exists between bit-map elements and PRB pairs in a DL BW. If a value of a bit-map element is a '1', a UE may consider a respective PRB pair for potential EPDCCH transmissions; otherwise, if a value of a bit-map element is a '0', a UE may not consider a respective PRB pair for potential EPDCCH transmissions. An implicit indexing of PRB pairs may be derived by a UE from a position of a PRB pair in a DL BW; for example, PRB pairs may be indexed in ascending frequency order.

In relatively small DL BWs, such as for example ones consisting of a number of PRB pairs smaller than or equal to 25, it may not be possible for all TPs from which a UE receives a signal with non-negligible power to configure different (non-overlapping) respective sets of PRB pairs for respective EPDCCH transmissions. In such cases, an EPDCCH transmission from a TP to a UE experiences (at least partly) interference from EPDCCH transmissions from other TPs to other UEs. Interference randomization is then desirable to improve a reception reliability of an EPDCCH by increasing a probability that an EPDCCH transmission from a first TP to a first UE will not interfere in the same resources with another EPDCCH transmission from a second TP to a second UE. This can be achieved by interleaving locations in PRB pairs for EREGs which is equivalent to interleaving a PRB pair indexing.

FIG. 9 illustrates an interference randomization method for EPDCCH transmissions by interleaving an indexing of PRB pairs used to transmit EPDCCHs from different TPs.

Referring to FIG. 9, a first TP uses a first indexing of PRB pairs used to transmit EPDCCHs 910, 912, 914, and 916. Even though this indexing is a nominal one, derived by indexing PRB pairs in an ascending frequency order, it may be an outcome of interleaving for a nominal indexing of PRB pairs. A second TP, using the same PRB pairs to transmit EPDCCHs as a first TP, uses a second indexing of such PRB pairs 920, 922, 924, and 926. An ECCE indexing for a first TP 930 and an ECCE indexing for a second TP 940 may be both obtained using Equation (2). In particular, considering a nominal PRB pair indexing according to an ascending frequency order for deriving EREGs in PRB pairs and defining ECCEs, a fourth PRB pair (PBR 3 920) is indexed first, a second PRB pair (PBR 1 922) is indexed second, a first PRB pair (PBR 0 924) is indexed third, and a third PRB pair (PBR 2 926) is indexed fourth. A consequence of this interleaving for an indexing of PRB pairs is that a first EPDCCH transmitted from a first TP and a second EPDCCH transmitted from a second TP may use the same ECCEs but use different EREGs. For example, a first EPDCCH transmitted from a first TP using a first ECCE 950 is allocated different EREGs (corresponding to different resources in respective PRB pairs) than a second EPDCCH transmitted from a second TP using a same first ECCE 960.

Interleaving a PRB pair indexing for obtaining an interleaved content of EREGs for each ECCE, relative to a nominal content of EREGs for each ECCE, is equivalent to maintaining a same PRB pair indexing and instead interleaving EREGs for each ECCE (using same interleaving for all ECCEs). Referring to FIG. 9, a second TP may instead have a same indexing of PRB pairs used to transmit EPDCCHs as a first TP, but EREGs of each ECCE used by a second TP may be interleaved so that a first EREG of ECCEs for a first TP is a third EREG for ECCEs for a second TP, a second EREG of ECCEs for a first TP is a second EREG for ECCEs for a second TP, a third EREG of ECCEs for a first TP is a fourth EREG for ECCEs for a second TP, and a fourth EREG of ECCEs for a first TP is a first EREG for ECCEs for a second TP.

An interleaving applied to EREGs in ECCEs of a TP (or to an indexing of PRB pairs used to transmit EPDCCHs) may be either configured to a UE by a TP through higher layer signaling or be implicitly derived by a UE through implicit or explicit signaling of an identity for a respective TP. For example, for 4 EREGs per ECCE, higher layer signaling consisting of 2 bits for each EREG in an ECCE (for a total of 8 bits) may explicitly configure a position for each of the 4 EREGs in an ECCE. Alternatively, based on an identity of a TP, a UE may determine a permutation of 4 EREGs within each ECCE based on an interleaving function. To improve randomization of interference experienced by an EPDCCH transmission, a permutation of 4 EREGs within each ECCE of a TP may also vary across subframes according to a subframe index. Regardless of a specific method used to specify a permutation of EREGs for each ECCE used to transmit EPDCCHs from a TP, the fourth object of the first embodiment considers that EREGs for each ECCE may be permuted for a respective TP.

A fifth object of the first embodiment is an allocation method for ECCEs used to transmit distributed EPDCCHs and localized EPDCCHs in a same set of PRB pairs.

Multiplexing of distributed EPDCCHs and localized EPDCCHs in a same PRB pair may be achieved by allocating different EREGs to each EPDCCH transmission type. For ECCEs for transmitting distributed EPDCCHs constructed from EREGs as described above by the previous aspects of the first embodiment, a signaling to a UE of EREGs used to transmit distributed EPDCCHs may be based on a signaling of respective EREGs only in a first respective PRB pair.

FIG. 10 illustrates a partitioning of EREGs for allocation to distributed EPDCCHs and to localized EPDCCHs.

Referring to FIG. 10, for a UE configured with 4 PRB pairs for EPDCCH transmissions 1010, 1012, 1014, and 1016, higher layer signaling using a first bit-map 1020 indicating EREGs in a first PRB pair used to transmit distributed (or localized) EPDCCHs is sufficient for determining all EREGs in all PRB pairs used to distributed EPDCCHs or localized EPDCCHs as EREGs used to transmit distributed EPDCCHs in subsequent PRB pairs for a same ECCE are uniquely determined once a first EREG (in a first PRB pair) is determined. Using a first bit-map, a UE can determine that EREGs 0, 2, 4, 6, 8, 10, 12, and 14 in a first PRB pair may be used to transmit distributed EPDCCHs (a binary 1 is assumed to indicate an EREG used to transmit a distributed EPDCCH). Based on a structure of respective ECCEs 1030, a UE can determine all EREGs in all PRB pairs used for transmitting distributed EPDCCHs or localized EPDCCHs. A compression of a number of bits in a respective bit-map may be achieved by considering that an ECCE consists of 4 EREGs and therefore a number of EREGs used for transmitting localized EPDCCHs in a PRB pair is a multiple of 4. Then, instead of a first bit-map, a second bit-map 1040 consisting of 4 elements may be used to indicate quadruplets of EREGs, 1050, 1052, 1054 and 1056, assigned for transmitting distributed EPDCCHs or for transmitting localized EPDCCHs in a PRB pair. Quadruplets of EREGs are assumed to consist of contiguous EREGs in a first PRB pair, starting from a first EREG, but any other ordering may also apply (for example, a quadruplet of EREGs may consist of every other EREG or of every fourth EREG).

FIG. 11 illustrates a TP transmitter for an EPDCCH by determining an ECCE structure.

Figure 2:
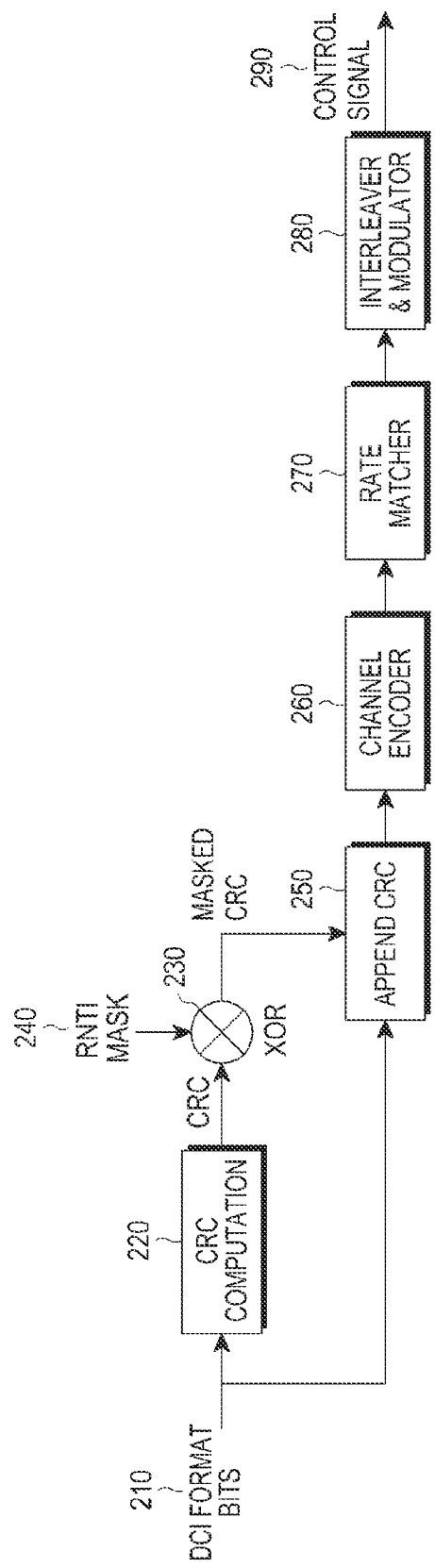
FIG. 2 illustrates an encoding and transmission process for a DCI format.

Referring to FIG. 11, a TP considers a set of PRB pairs assigned to a UE for receiving EPDCCHs 1110. Based on this set of PRB pairs, a TP determines an ECCE structure for an EPDCCH transmission to a UE 1120. A TP may transmit a DCI format to a UE using a respective ECCE structure 1130, for example as described in FIG. 2, using one of the possible ECCE aggregation levels.

FIG. 12 illustrates a UE receiver for an EPDCCH by determining an ECCE structure.

Figure 3:
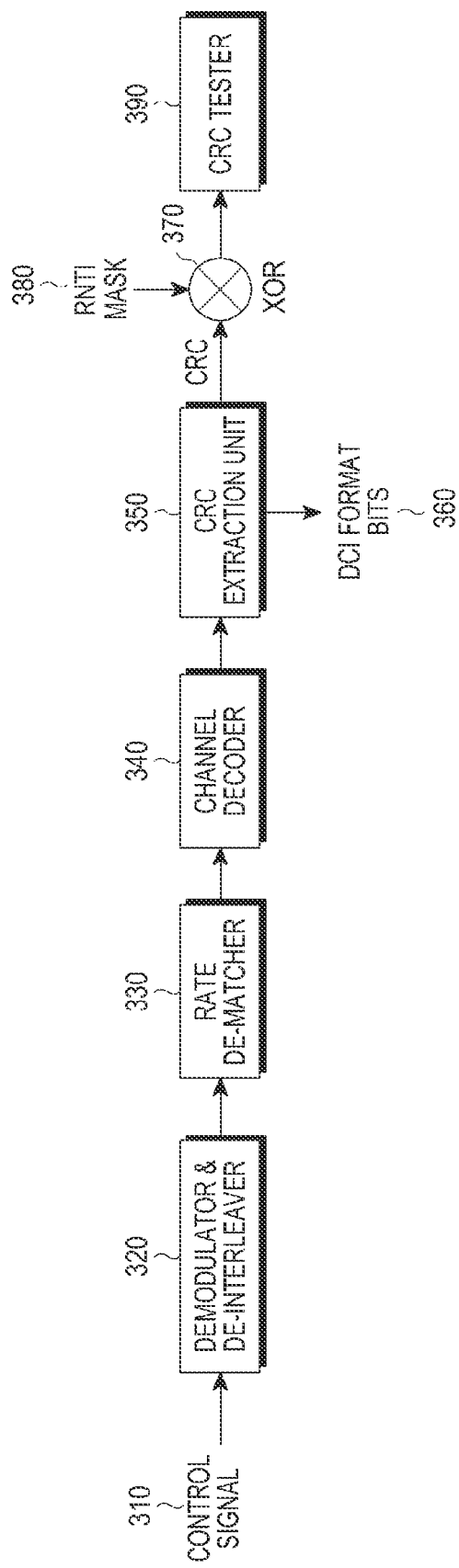
FIG. 3 is a block diagram illustrating a reception and decoding process for a DCI format.
Figure 4:
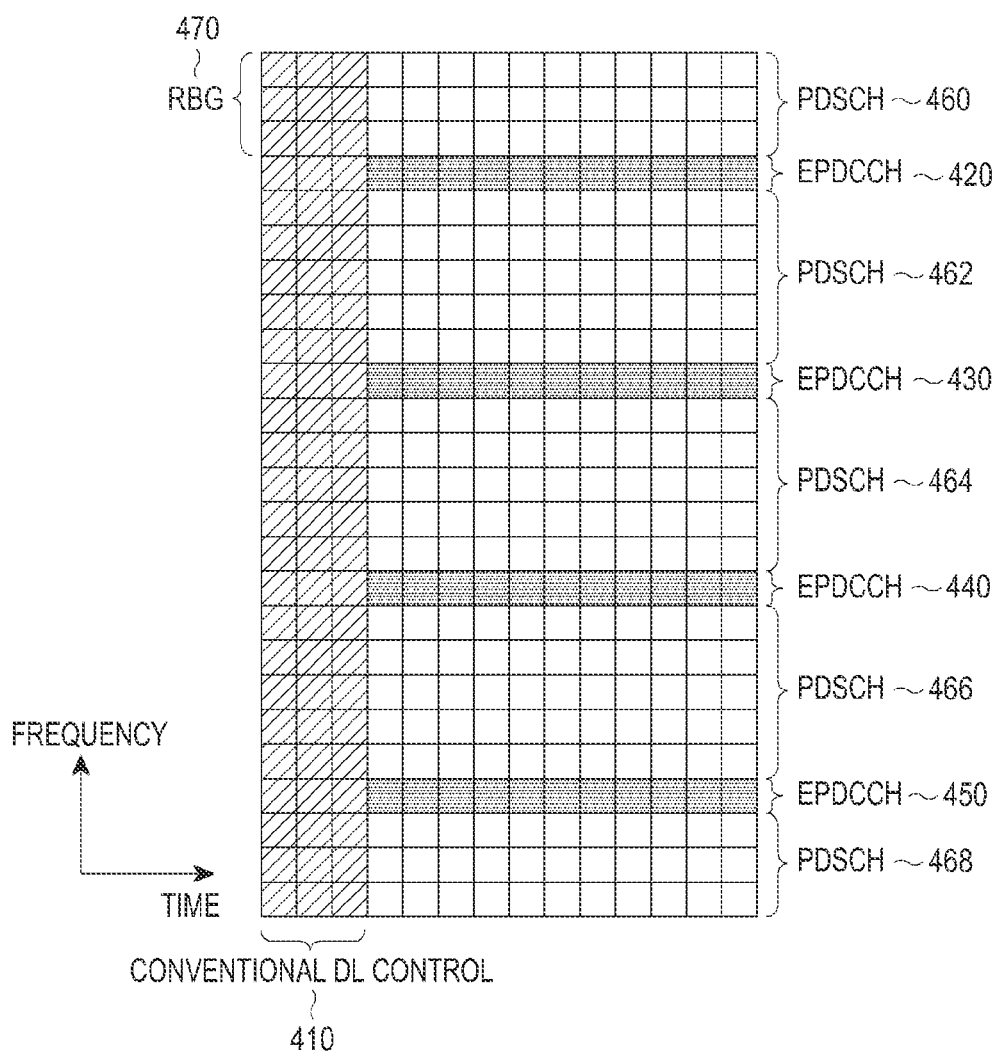
FIG. 4 is a diagram illustrating an EPDCCH transmission structure in a DL TTI.

Referring to FIG. 12, as for an EPDCCH transmission from a TP, a UE considers a set of PRB pairs assigned to it by a TP for receiving EPDCCHs 1210. Based on this set of PRB pairs, a UE determines an ECCE structure for an EPDCCH reception 1220. A UE may perform EPDCCH decoding operations for the possible ECCE aggregation levels to detect a DCI format, for example as described in FIG. 3, using a respective ECCE structure 1230.

The second embodiment of the present invention considers a method for a UE configured with a single serving cell to determine a first subframe symbol for a PDSCH reception depending on whether a respective scheduling is by a PDCCH or by an EPDCCH. If a UE receives an SPS PDSCH, a respective first subframe symbol may be determined depending on an associated sub frame.

A UE configured with a single serving cell (that is, configured for communication in a single carrier), determines a first subframe symbol for an EPDCCH reception either by detecting a PCFICH or by a respective configuration through higher layer signaling (for example, of a parameter "epdcch-StartSymbol"). If a PDSCH is scheduled by an EPDCCH, they both have a same first subframe symbol "epdcch-StartSymbol". If a UE is configured by higher layer signaling a first subframe symbol for EPDCCH/PDSCH reception, this configuration overrides a respective one obtained by detecting a CFI value in a respective PCFICH.

Moreover, a UE may configure a set of subframes in a frame (consisting of ten subframes) over which it may perform EPDCCH decoding, while for remaining subframes in a frame, a UE may perform PDCCH decoding operations. A configuration of this set of subframes may be through a bit-map consisting of ten bits having a one-to-one correspondence with subframes in a frame. For example, for a respective subframe, a binary value of '1' may indicate to a UE to perform EPDCCH decoding operations in an enhanced UE-DSS while a binary value of '0' may indicate to a UE to perform PDCCH decoding operations in a conventional UE-DSS. Moreover, assuming that a CSS does not exist for EPDCCHs, a UE perform PDCCH decoding operations in a conventional CSS in every subframe.

When a UE schedules a PDSCH by an EPDCCH and configures a first subframe symbol "epdcch-StartSymbol" for EPDCCH/PDSCH reception, there is a need for a UE to determine a first subframe symbol for a PDSCH reception in a subframe a UE is configured to perform EPDCCH decoding operations, but a respective PDSCH is scheduled through a PDCCH in a conventional CSS. There is also a need for a UE to determine a first subframe symbol for SPS PDSCH.

The second embodiment of the invention considers that for a PDSCH scheduled by PDCCH in a conventional CSS in a subframe where a UE is configured to perform EPDCCH decoding operations, a UE determines a starting subframe symbol based on a detected CFI value in a respective PCFICH even if a UE configures by higher layer signaling a starting subframe symbol for EPDCCH/PDSCH reception. A reason for such differentiation is that a PDSCH scheduled by a PDCCH in a conventional CSS may convey information to multiple UEs, such as for example system information, including to UEs that do not monitor EPDCCH and have not configured an "epdcch-StartSymbol" parameter.

Figure 13:
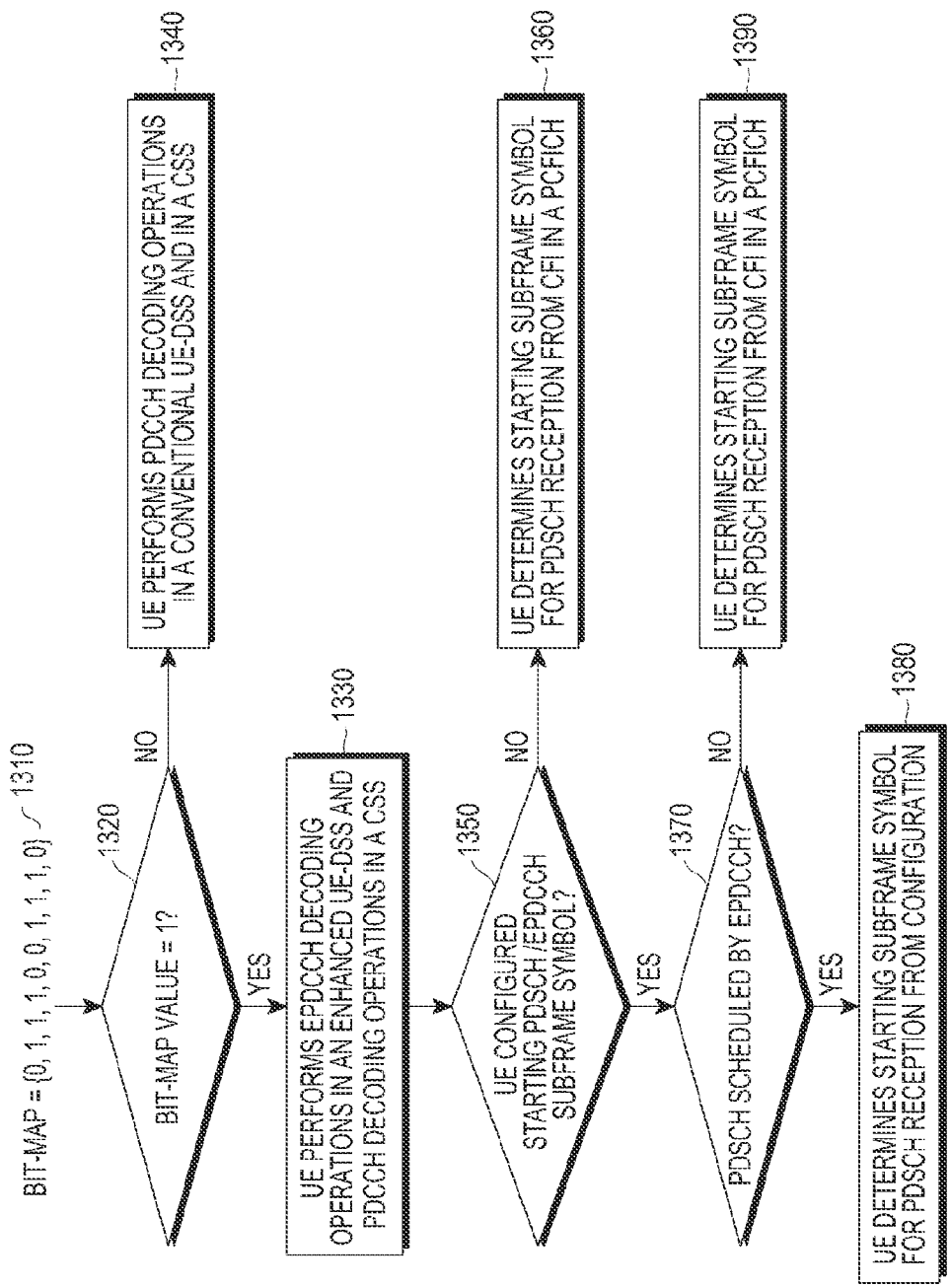
FIG. 13 is a flowchart illustrating a method by a UE to determine a starting subframe symbol for PDSCH reception in a subframe the UE is configured to monitor EPDCCH in an enhanced UE-DSS when the UE also performs PDCCH decoding operations in a conventional CSS, according to an embodiment of the present invention.

FIG. 13 illustrates a method by a UE to determine a starting subframe symbol for PDSCH reception in a subframe the UE configures to monitor EPDCCH in an enhanced UE-DSS when the UE also performs PDCCH decoding operations in a conventional CSS.

Referring to FIG. 13, a UE is informed by higher layer signaling from a TP of a bit-map of ten elements 1310 having a one-to-one correspondence with ten subframes in a frame. If for a subframe a respective bit-map value is a binary '1' in step 1320, the UE performs EPDCCH decoding operations in an enhanced UE-DSS in step 1330; otherwise, it performs PDCCH decoding operations in a conventional UE-DSS in step 1340. The UE also decodes PDCCHs in a CSS in a subframe. If the UE does not configure a starting EPDCCH/PDSCH subframe symbol in step 1350, it determines a starting subframe symbol for PDSCH reception from a detected CFI value in a PCFICH in a respective subframe in step 1360. Otherwise, if the UE schedules a PDSCH by an EPDCCH in step 1370, it determines a starting subframe symbol for PDSCH reception, which is the same as for a respective EPDCCH reception, as configured by higher layer signaling in step 1380. If the UE schedules a PDSCH by a PDCCH (from a CSS), it determines a starting subframe symbol for PDSCH reception from a detected CFI value in a PCFICH in a respective subframe in step 1390.

The second embodiment of the present invention also considers that for an SPS PDSCH reception, the UE determines a respective starting subframe symbol based on a respective subframe. If the UE receives an SPS PDSCH in a subframe where it configures to detect PDCCHs in a UE-DSS, the UE determines a respective starting subframe symbol based on a detected CFI value in a PCFICH. If the UE receives an SPS PDSCH in a subframe where it configures to detect EPDCCHs in a UE-DSS, the UE determines a respective starting subframe symbol based on a respective configuration by higher layer signaling (either for an EPDCCH or for a PDSCH) even if the UE detects in a conventional CSS a PDCCH that conveys a TPC command.

Figure 14:
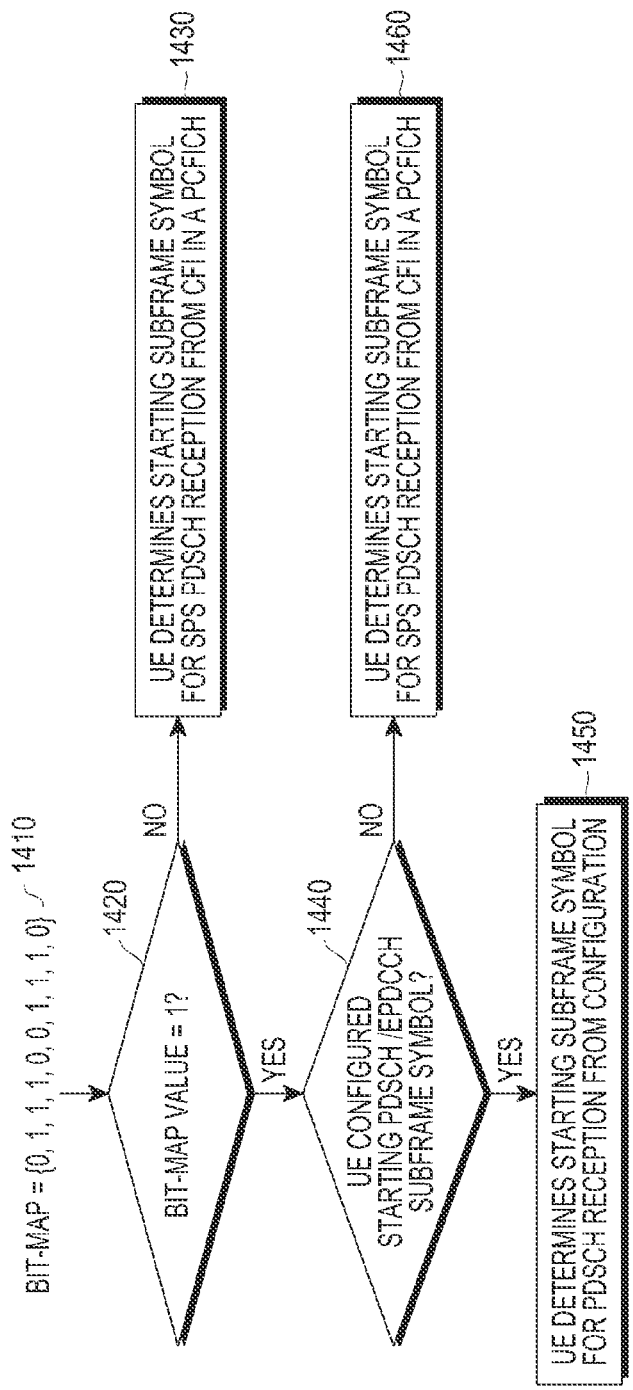
FIG. 14 is a flowchart illustrating a method by a UE to determine a first subframe symbol for an SPS PDSCH reception in a subframe depending on whether or not, for the subframe, the UE decodes EPDCCHs in an enhanced UE-DSS or PDCCHs in a conventional UE-DSS, according to an embodiment of the present invention.

FIG. 14 illustrates a method by a UE to determine a first subframe symbol for an SPS PDSCH reception in a subframe depending on whether or not, for the subframe, the UE decodes EPDCCHs in an enhanced UE-DSS or PDCCHs in a conventional UE-DSS.

Referring to FIG. 14, a UE is informed by higher layer signaling from a TP of a bit-map of ten elements 1410 having a one-to-one correspondence with ten subframes in a frame where if for a subframe a respective bit-map value is a binary '1', the UE performs EPDCCH decoding operations in an enhanced UE-DSS; otherwise, it performs PDCCH decoding operations in a conventional UE-DSS. The UE determines a bit-map value for a subframe of an SPS PDSCH reception in step 1420. If it is not equal to a binary 1', the UE determines a starting subframe symbol for SPS PDSCH reception from a detected CFI value in a PCFICH in a respective subframe in step 1430. If it is equal to a binary '1', the UE considers whether a starting subframe symbol for EPDCCH/PDSCH reception is configured by higher layer signaling in step 1440. If it is, the UE determines a starting subframe symbol for PDSCH reception as configured by higher layer signaling in step 1450; otherwise, the UE determines a starting subframe symbol for PDSCH reception from a detected CFI value in a PCFICH in a respective subframe in step 1460.

Figure 15:
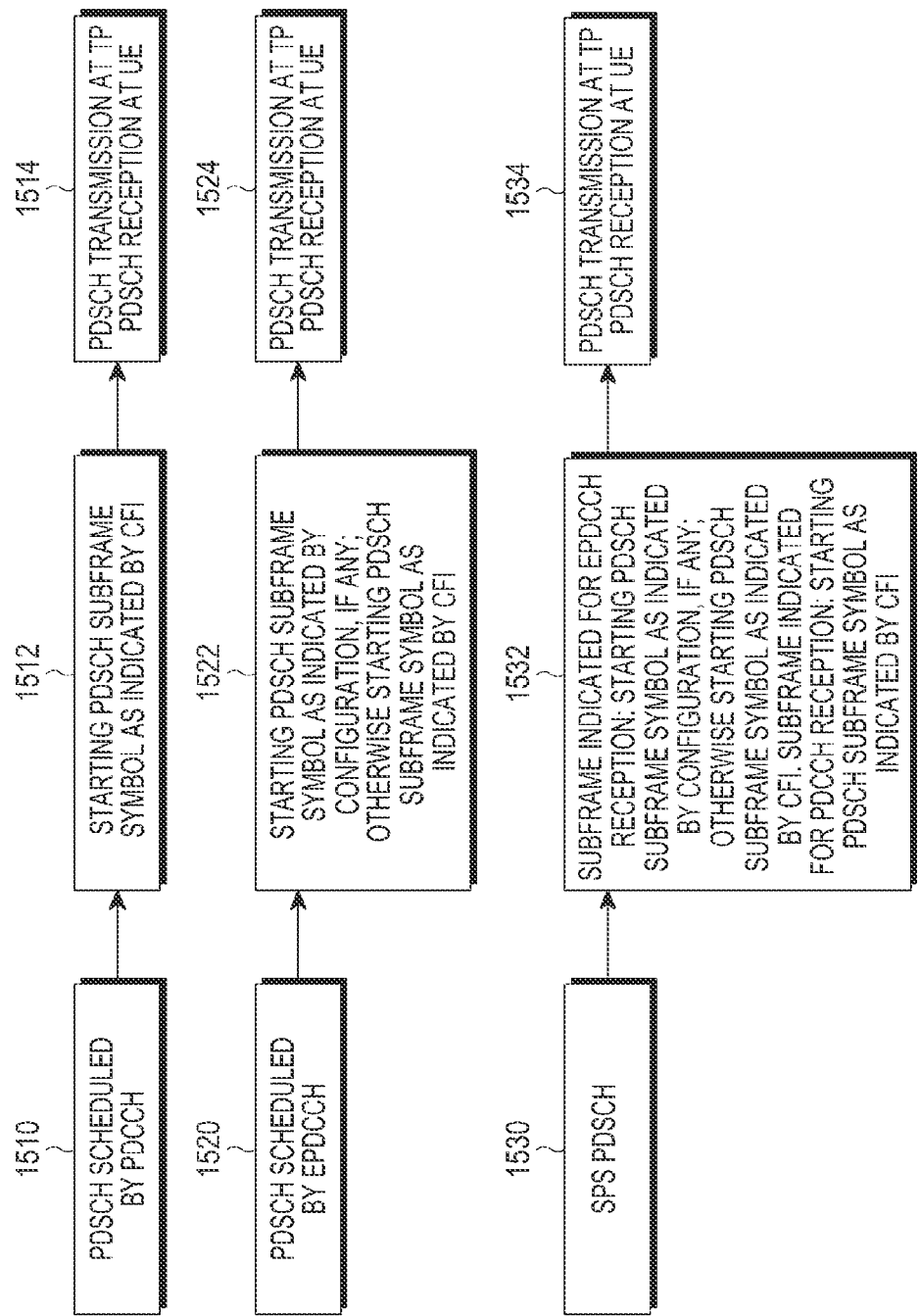
FIG. 15 is a diagram illustrating a method for a TP transmitter or a UE receiver to determine a starting subframe symbol of a scheduled PDSCH according to a control channel performing the scheduling or, for SPS PDSCH, according to the subframe, according to an embodiment of the present invention.

FIG. 15 illustrates a method for a TP transmitter or a UE receiver to determine a starting subframe symbol of a scheduled PDSCH according to a control channel performing the scheduling or, for an SPS PDSCH, according to the subframe.

Referring to FIG. 15, if a PDSCH is scheduled by a PDCCH in step 1510, a TP or a UE considers a starting PDSCH subframe symbol as derived by a CFI in a transmitted or detected PCFICH in step 1512 and accordingly transmits or receives a PDSCH in a subframe in step 1514, respectively. If a PDSCH is scheduled by an EPDCCH in step 1520, the TP or UE considers a starting PDSCH subframe symbol as it is indicated by a configuration to the UE by higher layer signaling, if any; otherwise the TP or UE considers a starting PDSCH subframe symbol as derived by a CFI in a transmitted or detected PCFICH in step 1522 and accordingly transmits or receives a PDSCH in a subframe in step 1524, respectively. For an SPS PDSCH in step 1530, the TP or UE considers whether a respective subframe is configured to the UE for performing decoding operations for EPDCCHs or for PDCCHs in a respective UE-DSS in step 1532. In the former case, the TP or UE considers a starting PDSCH subframe symbol as it is configured to the UE by higher layer signaling, if any; otherwise the TP or UE considers a starting PDSCH subframe symbol as it is derived by a CFI in a transmitted or detected PCFICH, respectively. In the latter case, the TP or UE considers a starting PDSCH subframe symbol as it is derived by a CFI in a transmitted or detected PCFICH, respectively. Based on a determination of a starting SPS PDSCH subframe symbol, the TP or UE subsequently transmits or receives an SPS PDSCH, respectively, in step 1534.

The third embodiment of the present invention considers the determination by a UE whether to include for a PDSCH reception a PRB pair in a set of PRB pairs configured for transmitting EPDCCHs when the PRB pair is included in an RBG indicated by a DL SA the UE detects for the PDSCH reception.

Typically, when a UE detects an EPDCCH conveying a DL SA scheduling a PDSCH in RBGs that include one or more PRB pairs in a set of PRB pairs configured to the UE for EPDCCH reception, the UE does not include for PDSCH reception the PRB pairs where the detected EPDCCH conveying the DL SA was detected. Conversely, the UE includes for PDSCH reception the PRB pairs where the detected EPDCCH conveying the DL SA was not received. However, although this UE behavior can always apply for localized EPDCCH transmissions, for distributed EPDCCH transmissions this UE behavior may result in unnecessary and detrimental scheduling restrictions.

Figure 16:
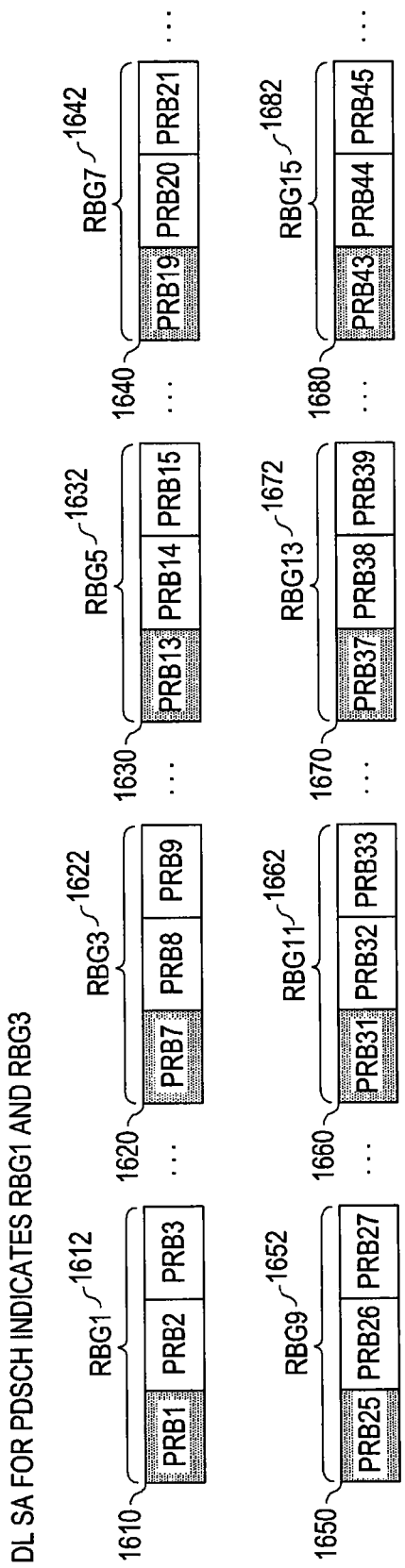
FIG. 16 is a diagram illustrating a configuration of a UE of 8 PRB pairs, in 8 respective RBGs, for transmitting distributed EPDCCHs and a detection by the UE of a distributed EPDCCH conveying a DL SA in at least one RBG that includes a PRB pair where the detected EPDCCH was not received by the UE, according to an embodiment of the present invention.

FIG. 16 is a diagram illustrating a configuration to a UE of 8 PRB pairs, in 8 respective RBGs, for transmitting distributed EPDCCHs and a detection by the UE of a distributed EPDCCH conveying a DL SA in at least one RBG that includes a PRB pair where the detected EPDCCH was not received by the UE.

Referring to FIG. 16, an RBG includes 3 PRB pairs and a UE is configured by a NodeB a set of PRB pairs for EPDCCH transmissions that includes (in pairs) PRB1 1610 in RBG1 1612, PRB7 1620 in RBG3 1622, PRB13 1630 in RBG5 1632, PRB19 1640 in RBG7 1642, PRB25 1650 in RBG9 1652, PRB31 1660 in RBG11 1662, PRB37 1670 in RBG13 1672, and PRB43 1680 in RBG15 1682. The UE detects an EPDCCH with Aggregation Level (AL) of 1 ECCE conveying a DL SA scheduling a PDSCH in RBG1 1612 and RBG3 1622. An ECCE consists of 4 EREGs and the EPDCCH is detected for an EPDCCH candidate with 1 ECCE and with the respective 4 EREGs located in PRB1 1610, PRB13 1630, PRB25 1650, and PRB37 1670, respectively. As a PRB pair in a set of PRB pairs configured to a UE for distributed EPDCCH transmissions may contain EREGs used to transmit EPDCCHs to other UEs, it is likely that although PRB7 1620 (and PRB19 1640, PRB31 1660, and PRB43 1680) were not used to transmit the EPDCCH conveying the DL SA to the reference UE, they are used to transmit EPDCCHs to other UEs.

One approach to avoid specifying a UE behavior regarding whether PRB pairs in a set of PRB pairs configured to the UE for EPDCCH transmissions should be included for PDSCH reception, when respective RBGs are indicated by a DL SA, would be to rely on a scheduler to not schedule PDSCH in RBGs that include PRB pairs where a detected EPDCCH conveying the DL SA is not transmitted. However, such a constraint requires scheduling restrictions and may also lead to PRB pairs remaining unutilized.

The third embodiment of the present invention considers that a UE detecting an EPDCCH conveying a DL SA scheduling a PDSCH in RBGs that include a subset of PRB pairs from a set of PRB pairs configured to the UE for distributed EPDCCH transmissions, discards the entire set of PRB pairs from PDSCH reception even when the EPDCCH conveying the DL SA is not received in some PRB pairs from the set of PRB pairs.

Additionally, PRB pairs for different sets of EPDCCH PRB pairs can exist in a same RBG. Assuming a maximum of two sets of PRB pairs configured to a UE, the second set (as identified by a respective index) is typically used when an EPDCCH cannot be transmitted in the first set (or example, when practically all ECCEs in the first set are used to transmit other EPDCCHs). Therefore, the fourth embodiment of the present invention considers that when a UE detects in a second set of PRB pairs an EPDCCH conveying a DL SA scheduling a PDSCH reception in a RBG that includes a PRB pair both from the first set of PRB pairs and from the second set of PRB pairs, the UE discards from PDSCH reception both the PRB pair from the first set of PRB pairs and the PRB pair from the second set of PRB pairs even though the UE did not receive the EPDCCH conveying the DL SA in the PRB pair from the first set of PRB pairs.

Conversely, when a UE detects in a first set of PRB pairs an EPDCCH conveying a DL SA scheduling a PDSCH reception in a RBG that includes a PRB pair both from the first set of PRB pairs and from the second set of PRB pairs, the UE discards from PDSCH reception only the PRB pair from the first set of PRB pairs and includes for PDSCH reception the PRB pair from the second set of PRB pairs. If the NodeB scheduler intends to use the PRB pair in the second set of PRB pairs for EPDCCH transmission, then it can avoid scheduling the respective RBG for PDSCH reception using for PDSCH scheduling (in other RBGs) an EPDCCH transmitted in the first set of PRB pairs. The above different treatment for PRB pairs in the first set of PRB pairs and in the second set of PRB pairs relies on the operational characteristic that when the first set of PRB pairs is used to transmit EPDCCHs, the second set of PRB pairs may not be used to transmit EPDCCHs, while when the second set of PRB pairs is used to transmit EPDCCHs, the first set of PRB pairs is practically certain to also be used to transmit EPDCCHs.

Figure 17:
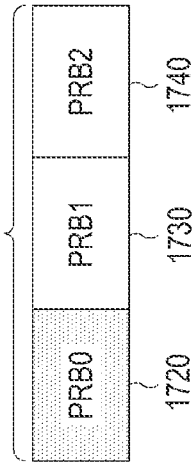
FIG. 17 is a diagram illustrating a method by a UE to determine whether or not to include a PRB pair for PDSCH reception when the PRB pair is included in one of two sets of PRB pairs the UE is configured for detecting EPDCCHs, according to an embodiment of the present invention.

FIG. 17 is a diagram illustrating a method by a UE to determine whether or not to include a PRB pair for PDSCH reception when the PRB pair is included in one of two sets of PRB pairs the UE is configured for detecting EPDCCHs.

Referring to FIG. 17, a UE configured with two sets of EPDCCH PRB pairs, detects a DL SA scheduling a PDSCH reception at least in RBG0 1710 that includes (pairs) PRB0 1720, PRB1 1730, and PRB2 1740. If the EPDCCH conveying the DL SA was received in the first set of EPDCCH PRB pairs that includes PRB0, the UE includes PRB1 and PRB2 and does not include PRB0 for PDSCH reception. If the EPDCCH conveying the DL SA was received in the second set of EPDCCH PRB pairs that includes PRB1, the UE includes PRB2 and does not include PRB0 and PRB1 for PDSCH reception.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method for a user equipment (UE) to receive a physical downlink shared channel (PDSCH) transmitted by a base station, the method comprising:
  receiving first information indicating one or more subframes in which the UE is configured to monitor a first type physical downlink control channel (PDCCH), and second information indicating a start symbol for the first type PDCCH in a subframe;
  receiving third information indicating a symbol duration for receiving a second type PDCCH in a subframe;
  determining a starting symbol for the PDSCH in a first subframe indicated by the first information, based on the second information, if the PDSCH is scheduled by the first type PDCCH in the first subframe;
  determining the starting symbol for the PDSCH in a second subframe, which is not indicated by the first information, based on the third information, if the PDSCH is scheduled by the second type PDCCH in the second subframe; and receiving, from a base station, the PDSCH based on the determined starting symbol, wherein, if the PDSCH is not scheduled by the first type PDCCH or the second type PDCCH in a third subframe, the starting symbol for the PDSCH in the third subframe is determined based on one of the second information and the third information depending on whether the third subframe is indicated by the first information.

2. The method of claim 1, further comprising:
determining the starting symbol for the PDSCH in the third subframe, which is not indicated by the first information, based on the third information, if the PDSCH is not scheduled by the first type PDCCH or the second type PDCCH in the third subframe.

3. The method of claim 1, further comprising:
determining the starting symbol for the PDSCH in the third subframe indicated by the first information, based on the second information, if the PDSCH is not scheduled by the first type PDCCH or the second type PDCCH in the third subframe.

4. The method of claim 1, wherein the first information comprises a bit map comprising a plurality of bits corresponding with a plurality of subframes respectively, a bit value of one in the bit map indicates a subframe in which the UE is configured to monitor the first type PDCCH on a first UE-dedicated search space, and a bit value of zero in the bit map indicates a subframe in which the UE is configured to monitor the second type PDCCH on a second UE-dedicated search space.

5. The method of claim 1, wherein, if the starting symbol for the PDSCH is determined based on third information, the starting symbol for the PDSCH is determined as a value indicated by the third information plus one.

6. The method of claim 1, wherein, if the PDSCH is not scheduled by the first type PDCCH or the second type PDCCH in a subframe indicated by the first information, the base station transmits to the UE the second type PDCCH on a UE-common search space that conveys a power control command for adjusting a power of an uplink transmission by the UE.

7. A method for a base station to transmit a physical downlink shared channel (PDSCH) to a user equipment (UE), the method comprising:
transmitting, to the UE, first information indicating one or more subframes in which the UE is configured to monitor a first type physical downlink control channel (PDCCH) and second information indicating a start symbol for the first type PDCCH in a subframe;
transmitting, to the UE, third information indicating a symbol duration for receiving a second type PDCCH in a subframe;
determining a starting symbol for the PDSCH in a first subframe indicated by the first information, based on the second information, if the PDSCH is scheduled by the first type PDCCH in the first subframe;
determining the starting symbol for the PDSCH in a second subframe, which is not indicated by the first information, based on the third information, if the PDSCH is scheduled by the second type PDCCH in the second subframe; and
transmitting the PDSCH based on the determined starting symbol, wherein, if the PDSCH is not scheduled by the first type PDCCH or the second type PDCCH in a third subframe, the starting symbol for the PDSCH in the third subframe is determined based on one of the second information and the third information depending on whether the third subframe is indicated by the first information.

8. The method of claim 7, further comprising:
determining the starting symbol for the PDSCH in the third subframe, which is not indicated by the first information, based on the third information, if the PDSCH is not scheduled by the first type PDCCH or the second type PDCCH in the third subframe.

9. The method of claim 7, further comprising:
determining the starting symbol for the PDSCH in the third subframe indicated by the first information, based on the second information, if the PDSCH is not scheduled by the first type PDCCH or the second type PDCCH in the third subframe.

10. The method of claim 7, wherein the first information comprises a bit map comprising a plurality of bits corresponding with a plurality of subframes respectively, a bit value of one in the bit map indicates a subframe in which the UE is configured to monitor the first type PDCCH on a first UE-dedicated search space, and a bit value of zero in the bit map indicates a subframe in which the UE is configured to monitor the second type PDCCH on a second UE-dedicated search space.

11. The method of claim 7, wherein, if the starting symbol for the PDSCH is determined based on the third information, the starting symbol for the PDSCH is determined as a value indicated by the third information plus one.

12. The method of claim 7, wherein, if the PDSCH is not scheduled by the first type PDCCH or the second type PDCCH in a subframe indicated by the first information, the base station transmits to the UE the second type PDCCH on a UE-common search space that conveys a power control command for adjusting a power of an uplink transmission by the UE.

13. An apparatus of a user equipment (UE) for receiving a physical downlink shared channel (PDSCH) transmitted from a base station, the apparatus comprising:
a receiver configured to receive first information indicating one or more subframes in which the UE is configured to monitor a first type physical downlink control channel (PDCCH) and second information indicating a start symbol for the first type PDCCH in a subframe, receive third information indicating a symbol duration for receiving a second type PDCCH in a subframe, and receive, from the base station, the PDSCH based on a starting symbol for the PDSCH; and
a computing unit configured to determine the starting symbol for the PDSCH in a first subframe indicated by the first information, based on the second information, if the PDSCH is scheduled by the first type PDCCH in the first subframe, and determine the starting symbol for the PDSCH in a second subframe, which is not indicated by the first information, based on the third information, if the PDSCH is scheduled by the second type PDCCH in the second subframe, wherein, if the PDSCH is not scheduled by the first type PDCCH or the second type PDCCH in a third subframe, the starting symbol for the PDSCH in the third subframe is determined based on one of the second information and the third information depending on whether the third subframe is indicated by the first information.

14. The apparatus of claim 13, wherein the computing unit is further configured to:
determine the starting symbol for the PDSCH in the third subframe, which is not indicated by the first information, based on the third information, if the PDSCH is not scheduled by the first type PDCCH or the second type PDCCH in the third subframe.

15. The apparatus of claim 13, wherein the computing unit is further configured to:
determine the starting symbol for the PDSCH in the third subframe indicated by the first information, based on the second information, if the PDSCH is not scheduled by the first type PDCCH or the second type PDCCH in the third subframe.

16. The apparatus of claim 13, wherein the first information comprises a bit map comprising a plurality of bits corresponding with a plurality of subframes respectively, a bit value of one in the bit map indicates a subframe in which the UE is configured to monitor the first type PDCCH on a first UE-dedicated search space, and a bit value of zero in the bit map indicates a subframe in which the UE is configured to monitor the second type PDCCH on a second UE-dedicated search space.

17. The apparatus of claim 13, wherein, if the starting symbol for the PDSCH is determined based on the third information, the starting symbol for the PDSCH is determined as a value indicated by the third information plus one.

18. The apparatus of claim 13, wherein, if the PDSCH is not scheduled by the first type PDCCH or the second type PDCCH in a subframe indicated by the first information, the base station transmits to the UE the second type PDCCH on a UE-common search space that conveys a power control command for adjusting a power of an uplink transmission by the apparatus.

19. An apparatus of a base station for transmitting a physical downlink shared channel (PDSCH) transmitted to a user equipment (UE) the apparatus comprising:
a transmitter configured to transmit, to the UE, first information indicating one or more subframes in which the UE is configured to monitor a first type physical downlink control channel (PDCCH) and second information indicating a start symbol for the first type PDCCH in a subframe, transmit, to the UE, third information indicating a symbol duration for receiving a second type PDCCH in a subframe, and transmit, to the UE, the PDSCH based on a starting symbol for the PDSCH, and
a computing unit configured to determine the starting symbol for the PDSCH in a first subframe indicated by the first information, based on the second information, if the PDSCH is scheduled by the first type PDCCH in the first subframe, and determine the starting symbol for the PDSCH in a second subframe, which is not indicated by the first information, based on the third information, if the PDSCH is scheduled by the second type PDCCH in the second subframe,
wherein, if the PDSCH is not scheduled by the first type PDCCH or the second type PDCCH in a third subframe, the starting symbol for the PDSCH in the third subframe is determined based on one of the second information and the third information depending on whether the third subframe is indicated by the first information.

20. The apparatus of claim 19, wherein the computing unit is further configured to:
determine the starting symbol for the PDSCH in the third subframe, which is not indicated by the first information, based on the third information, if the PDSCH is not scheduled by the first type PDCCH or the second type PDCCH in the third subframe.

21. The apparatus of claim 19, wherein the computing unit is further configured to:
determine the starting symbol for the PDSCH in the third subframe indicated by the first information, based on the second information, if the PDSCH is not scheduled by the first type PDCCH or the second type PDCCH in the third subframe.

22. The apparatus of claim 19, wherein the first information comprises a bit map comprising a plurality of bits corresponding with a plurality of subframes respectively, a bit value of one in the bit map indicates a subframe in which the UE is configured to monitor the first type PDCCH on a first UE-dedicated search space, and a bit value of zero in the bit map indicates a subframe in which the UE is configured to monitor the second type PDCCH on a second UE-dedicated search space.

23. The apparatus of claim 19, wherein, if the starting symbol for the PDSCH is determined based on the third information, the starting symbol for the PDSCH is determined as a value indicated by the third information plus one.

24. The apparatus of claim 19, wherein, if the PDSCH is not scheduled by the first type PDCCH or the second type PDCCH in a subframe indicated by the first information, the base station transmits to the UE the second type PDCCH in the UE-common search space that conveys a power control command for adjusting a power of an uplink transmission by the UE.

* * * * *